(12) United States Patent
Fischer et al.

(10) Patent No.: US 9,272,685 B2
(45) Date of Patent: Mar. 1, 2016

(54) AIR BAG WITH ADAPTIVE VENT

(71) Applicant: TRW Vehicle Safety Systems Inc., Washington, MI (US)

(72) Inventors: Kurt F. Fischer, Leonard, MI (US); Yohann Le Norcy, Valladolid (ES); Oscar Ugarte, Valladolid (ES); Douglas Gould, Lake Orion, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 14/556,312

(22) Filed: Dec. 1, 2014

(65) Prior Publication Data

US 2015/0283972 A1 Oct. 8, 2015

Related U.S. Application Data

(60) Provisional application No. 61/912,813, filed on Dec. 6, 2013.

(51) Int. Cl.
*B60R 21/276* (2006.01)
*B60R 21/239* (2006.01)
*B60R 21/2338* (2011.01)

(52) U.S. Cl.
CPC .............. *B60R 21/276* (2013.01); *B60R 21/239* (2013.01); *B60R 21/2338* (2013.01); *B60R 2021/2395* (2013.01); *B60R 2021/23384* (2013.01); *B60R 2021/2765* (2013.01)

(58) Field of Classification Search
CPC ................ B60R 21/276; B60R 21/239; B60R 21/2338; B60R 2021/2765; B60R 2021/23384; B60R 2021/2395
See application file for complete search history.

(56) References Cited

U.S. PATENT DOCUMENTS

| | | | | | |
|---|---|---|---|---|---|
| 6,832,778 | B2 * | 12/2004 | Pinsenschaum | ...... | B60R 21/233 280/739 |
| 7,784,828 | B2 * | 8/2010 | Matsu | ............. | B60R 21/233 280/739 |
| 8,419,058 | B2 | 4/2013 | Fischer et al. | | |
| 8,684,404 | B2 * | 4/2014 | Fischer | ............. | B60R 21/2338 280/739 |
| 8,684,407 | B2 * | 4/2014 | Fischer | ............. | B60R 21/2338 280/739 |
| 8,696,022 | B2 * | 4/2014 | Fischer | ............. | B60R 21/2338 280/739 |
| 8,727,378 | B2 * | 5/2014 | Hiruta | ............. | B60R 21/203 280/739 |
| 2009/0230663 | A1 * | 9/2009 | Mills | ............. | B60R 21/233 280/735 |

(Continued)

*Primary Examiner* — Drew Brown
(74) *Attorney, Agent, or Firm* — Tarolli, Sundheim, Covell & Tummino LLP

(57) ABSTRACT

An apparatus (10) including a protection device (14) has a front panel (74) presented towards an occupant (20, 20*a*) and is inflatable between a vehicle surface (36, 38) and the occupant (20, 20*a*). A vent (100) releases inflation fluid from the protection device (14). The vent (100) has an actuated condition and a non-actuated condition prior to deployment of the protection device (14). A vent tether (154, 168) has a first end secured to the vent (100) end a second end having a releasable connection (153) with the protection device (14). A trigger tether (152,162) has a first end connected to the front panel (74) and a second end connected to the protection device (14) at the releasable connection (158). The trigger tether (152, 162) Is slackened when the protection device (14) deploys less than a predetermined degree such that the releasable connection (158) remains intact to allow the vent tether (154, 168) to place the vent (100) in the actuated condition. Deployment of the protection device (14) to the predetermined degree tensioning the trigger tether (152,162) to release the releasable connection (158) such that the vent (100) remains in the non-actuated condition.

25 Claims, 20 Drawing Sheets

(56) References Cited

U.S. PATENT DOCUMENTS

| | | | |
|---|---|---|---|
| 2010/0140910 A1* | 6/2010 | Fischer | B60R 21/233 280/743.2 |
| 2011/0031723 A1* | 2/2011 | Fischer | B60R 21/233 280/730.1 |
| 2011/0198828 A1* | 8/2011 | Fischer | B60R 21/233 280/743.2 |
| 2012/0074677 A1* | 3/2012 | Hiruta | B60R 21/2338 280/739 |
| 2012/0104737 A1 | 5/2012 | Fischer et al. | |
| 2013/0026744 A1 | 1/2013 | Fischer et al. | |

* cited by examiner

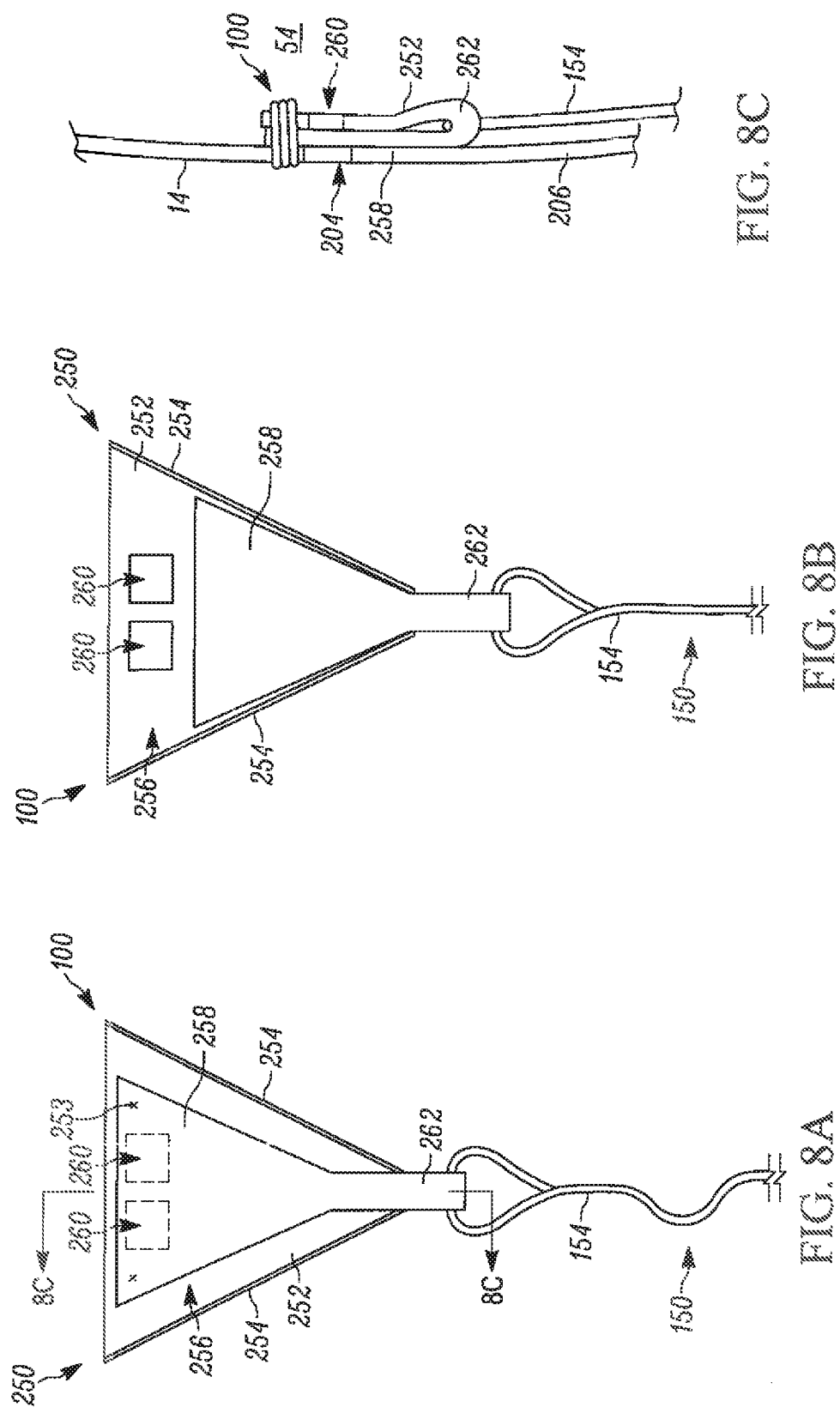

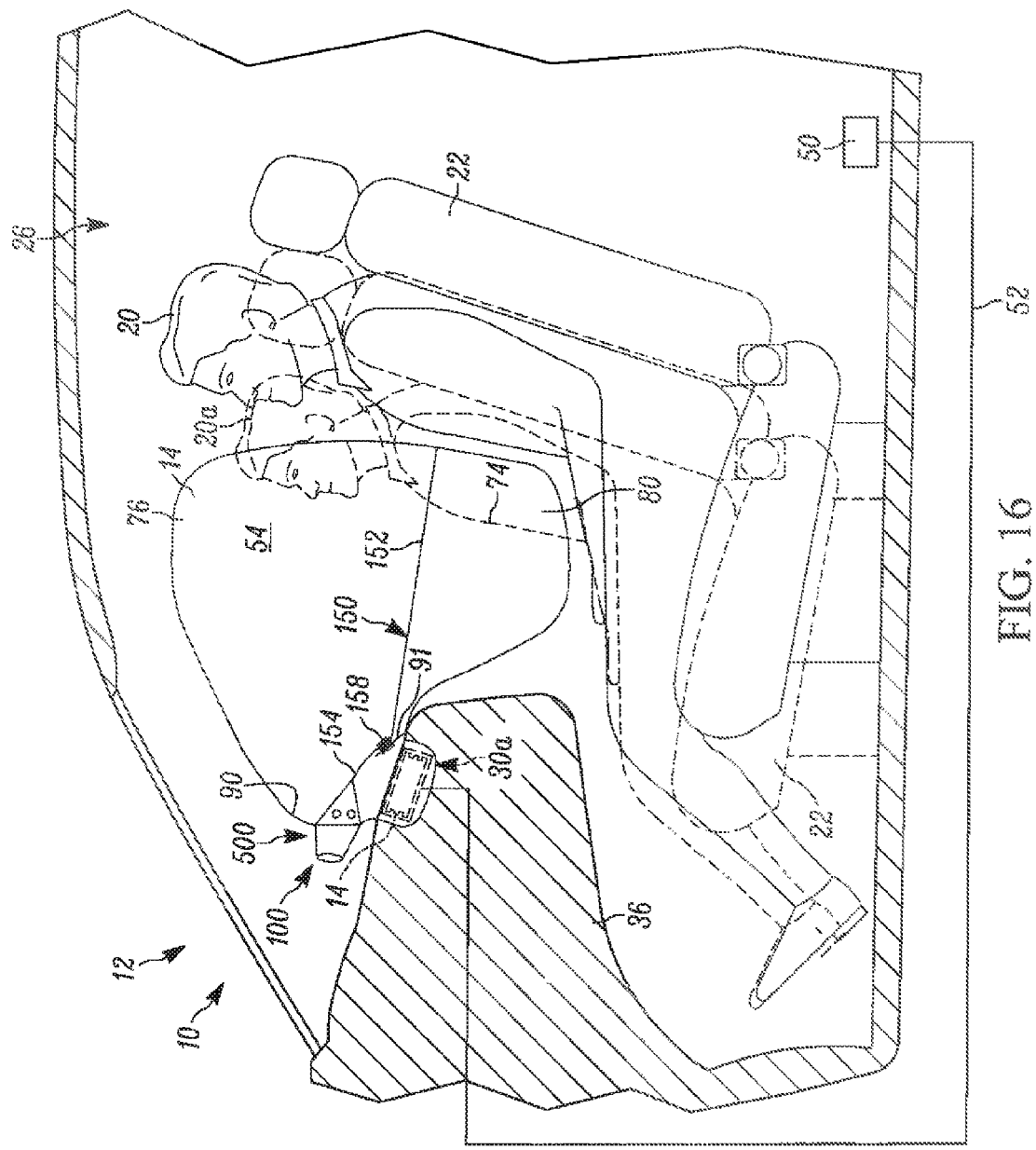

AIR BAG WITH ADAPTIVE VENT

RELATED APPLICATIONS

This application claims the benefit of U.S. Application Ser. No. 61/912,813, filed Dec. 6, 2013, the entirety of which is incorporated herein by reference.

FIELD OF THE INVENTION

The present invention relates to an apparatus for helping to protect an occupant of a vehicle. More particularly, the present invention relates to an air bag inflatable between a vehicle surface and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags can be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition In a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result offerees exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bags the air bag cover opens to permit the air bag to move to an inflated position. The air bag cover opens as a result of forces exerted on the cover by the inflating driver air bag.

SUMMARY OF THE INVENTION

The present invention relates to an apparatus for helping to protect an occupant of a vehicle having an inflatable vehicle occupant protection device. The protection device includes a front panel presented towards the occupant and being inflatable between a vehicle surface and the occupant. A vent releases inflation fluid from the protection device. The vent has an actuated condition and a non-actuated condition prior to deployment of the protection device. A vent tether has a first end secured to the vent and a second end having a releasable connection with the protection device. A trigger tether has a first end secured to the front panel and a second end connected to the protection device at the releasable connection. The trigger tether is slackened when the protection device deploys less than a predetermined degree such that the releasable connection remains intact to allow the vent tether to place the vent in the actuated condition. Deployment of the protection device to the predetermined degree tensioning the trigger tether to release the releasable connection such that the vent remains in the non-actuated condition.

The present invention also relates to an apparatus for helping to protect an occupant of a vehicle that includes an inflatable vehicle occupant protection device having a front panel presented towards the occupant and being inflatable between a vehicle surface and the occupant. A vent for releasing inflation fluid from the protection device has an actuated condition releasing inflation fluid from the protection device and a non-actuated condition preventing the release of inflation fluid from the protection device. The vent is in the non-actuated condition prior to deployment of the protection device. A vent tether has a first end secured to the vent and a second end connected with a rear panel of the protection device opposite the front panel by rupturable tear stitching. A trigger tether integrally formed with the vent tether has a first end secured to the front panel and a second end connected to the protection device by the rupturable tear stitching. The trigger tether is slackened when the protection device deploys less than a predetermined degree such that the tear stitching remains intact to allow the vent tether to place the vent in the actuated condition. Deployment of the protection device to the predetermined degree tensions the trigger tether to rupture the tear stitching such that the vent remains in the non-actuated condition.

In accordance with another embodiment of the invention an apparatus for helping to protect an occupant of a vehicle includes an inflatable vehicle occupant protection device having a front panel presented towards the occupant and being inflatable between a vehicle surface and the occupant. A vent for releasing inflation fluid from the protection device has an actuated condition and a non-actuated condition. The vent is in the non-actuated condition prior to deployment of the protection device. A vent tether has a first end connected to the vent and a second end having a releasable connection with the protection device. A trigger tether has a first end connected to the front panel and a second end connected to the protection device at the releasable connection. The trigger tether is slackened when the protection device deploys less than a predetermined degree such that the releasable connection remains intact such that the vent remains in the non-actuated condition. Deployment of the protection device to the predetermined degree tensioning the trigger tether to release the releasable connection such that the vent tether moves to the actuated condition.

BRIEF DESCRIPTION OF THE DRAWINGS

The foregoing and other features of the present invention will become apparent to one skilled In the art to which the present invention relates upon consideration of the following description of the invention with reference to the accompanying drawings, in which:

FIGS. 8A-6C are schematic illustrations of a vent of the apparatus of FIGS. 1-3 in different conditions.

FIGS. 8A-8C are schematic illustrations of an alternative vent configuration of the apparatus of FIGS. 1-3 in different conditions.

FIG. 16 is a schematic side view illustrating another embodiment of an apparatus for helping to protect an occupant of a vehicle.

DETAILED DESCRIPTION OF THE INVENTION

Figure 1:
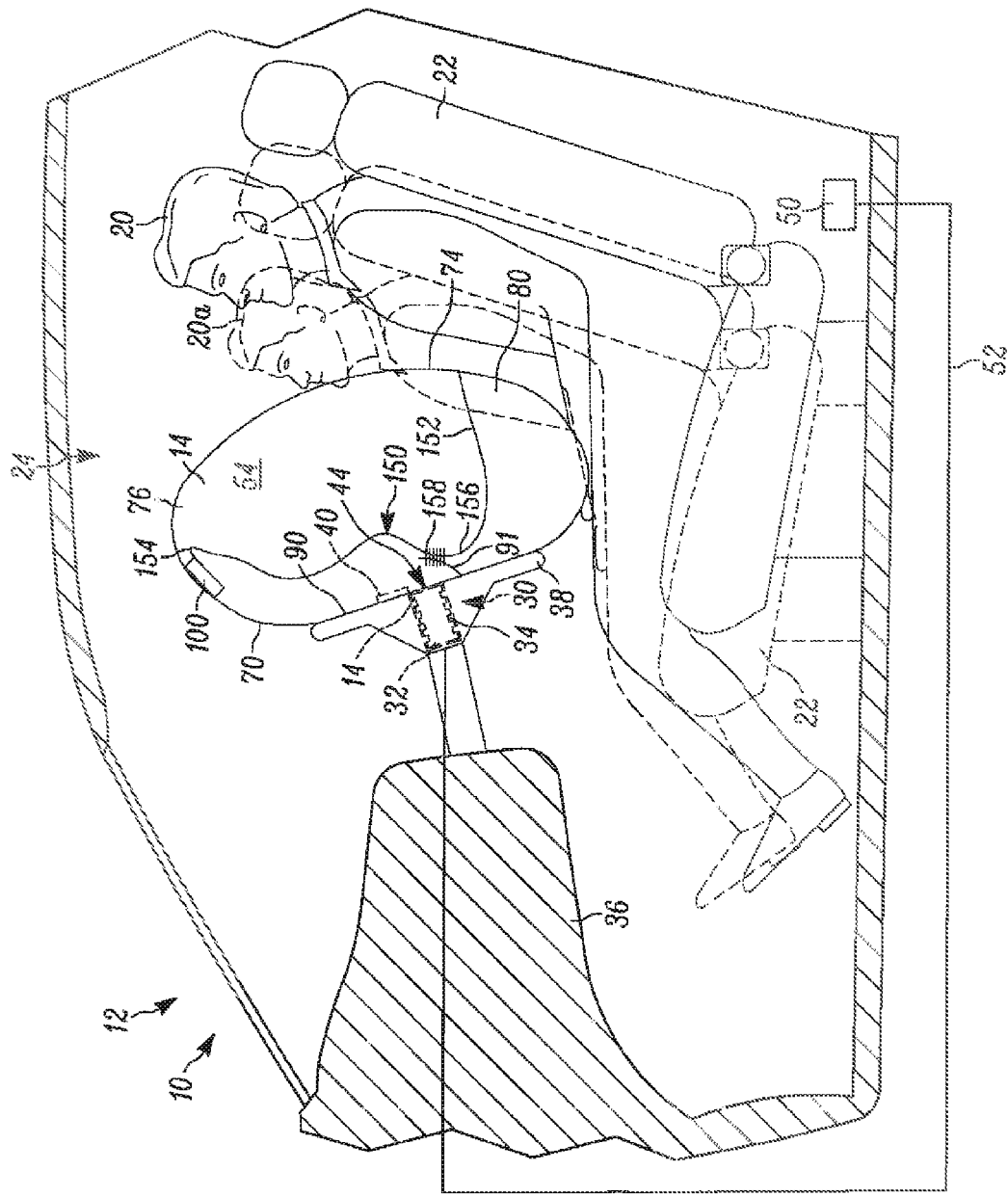
FIG. 1 is a schematic side view illustrating a first embodiment of an apparatus for helping to protect an occupant of a vehicle.
Figure 2:
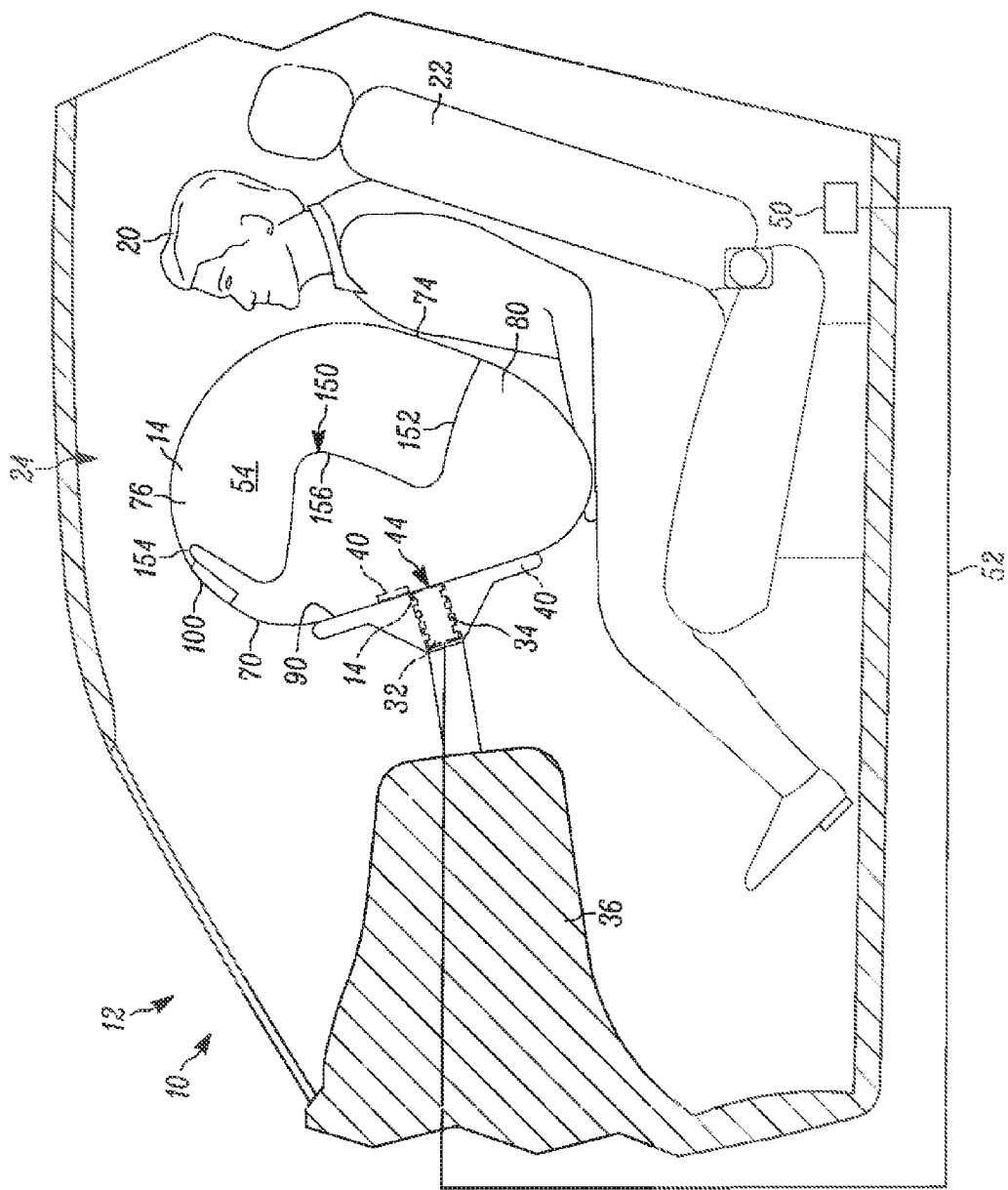
FIGS. 2 and 3 are schematic side views illustrating the apparatus of FIG. 1 in different conditions.
Figure 3:
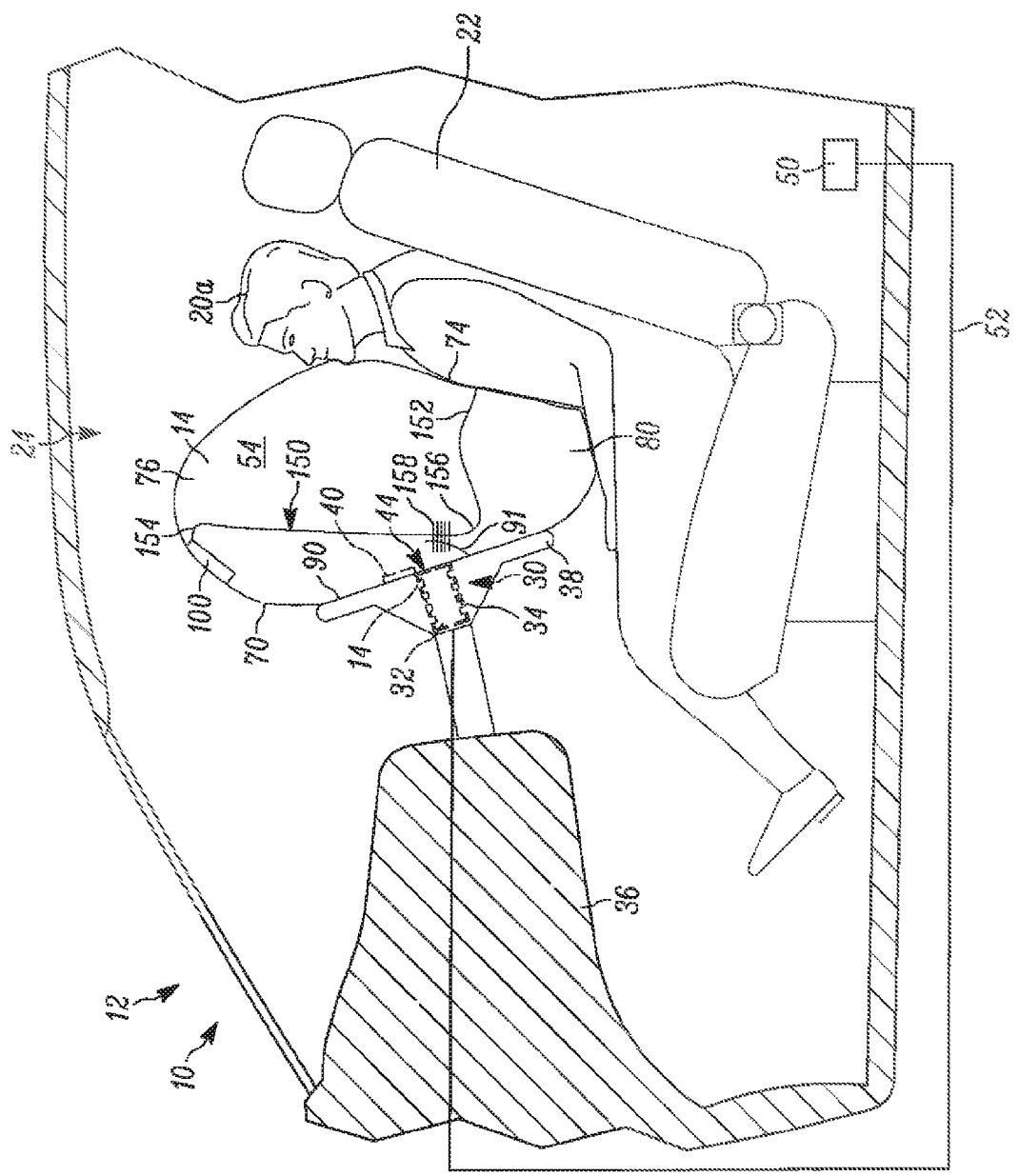

FIGS. 1-3 Illustrate an embodiment of an apparatus 10 for helping to protect an occupant 20 of a vehicle 12 that Includes an inflatable vehicle occupant protection device 14 in the form of an air bag. In the embodiment Illustrated In FIG. 1, the air bag 14 is a driver frontal air bag for helping to protect an occupant 20 of a seat 22 on a driver side 24 of the vehicle 12. Alternatively, the apparatus 10 can be employed in the passenger side 26 of the vehicle 12 for helping to protect the occupant 20 of a seat 22 therein (see FIG. 15).

The air bag 14 can be part of an air bag module 30 that includes an inflator 32 and a support or housing 34 for the air bag and inflator. The air bag 14 has a stored condition, indicated by dashed lines in FIG. 1, in which the air bag is folded and placed In the housing 34. The module 30 is mounted facing towards the occupant 20 in a steering wheel 38 of the vehicle 12. The housing 34 helps contain and support the air bag 14 and Inflator 32 in the steering wheel 38. Alternatively, the module 30 can be mounted to a dash or instrument panel 36 of the vehicle 12 (not shown).

An air bag door 40 is releasably connected to the steering wheel 38 and/or the housing 34. In a closed condition (not shown), the air bag door 40 forms a cover for the module 30 and helps enclose the air bag 14 in the stored condition In the housing 34. The door 40 is movable to an opened condition illustrated in FIG. 1 to uncover an opening 44 through which the air bag 14 can be deployed from the stored condition In the housing 34. The door 40 can be connected to the vehicle 12, e.g., the steering wheel 38, either directly or through the housing 34, by means (not shown), such as a plastic hinge portion, a strap or a tether.

The inflator 32 is actuatable to provide inflation fluid to an inflatable volume 54 of the air bag 14 to deploy the air bag to the inflated condition. The inflator 32 can be of any known type, such as stored gas, solid propellant, augmented or hybrid. The apparatus 10 also includes a sensor/controller, illustrated schematically at 50, for sensing an event for which Inflation of the air bag 14 is desired, such as a collision, and providing an actuation signal to the apparatus 10 in response to the sensed event. The inflator 32 is operatively connected to the sensor/controller 50 vi& lead wires 52.

The air bag 14 can be constructed of any suitable material, such as nylon, e.g., woven nylon 6-6 yarns, and can be constructed in any suitable manner. For example, the air bag 14 can include one or more pieces or panels of material. If more than one piece or panel is used, the pieces or panels can be interconnected by known means, such as stitching, ultrasonic welding, heat bonding, or adhesives, to form the air bag. The air bag 14 can be uncoated, coated with a material, such as a gas impermeable urethane, or laminated with a material, such as a gas impermeable film. The air bag 14 thus can have a gas-tight or substantially gas-tight construction. Those skilled in the art will appreciate that alternative materials, such as polyester yarn, and alternatives coatings, such as silicone, can also be used to construct the air bag 14.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates towards the occupant 20 from the stored condition to a deployed condition, such as the fully inflated and deployed condition illustrated in FIG. 2. The air bag 14, while inflated, helps protect the vehicle occupant 20 from impacts with parts of the vehicle 12, such as the steering wheel 38.

The air bag 14 can have one or more actuatable features for helping to control or tailor inflation of the air bag in response to vehicle conditions, occupant conditions or both. These features can be actuatable passively, for example, having a configuration responsive to physical conditions at the time of inflation and deployment. Examples of such actuatable features are illustrated in FIGS. 1-10.

In one instance, the actuatable feature constitutes a vent 100 that is actuatable to release inflation fluid from the inflatable volume 54 of the air bag. A tether 150 is provided for selectively actuating the vent 100 in response to vehicle conditions, occupant conditions or a combination of vehicle and occupant conditions at the time of the occurrence of the event for which inflation and deployment of the air bag 14 is triggered. The vent 100 is secured to a portion of the air bag 14 adjacent the steering wheel 38, e.g., a rear portion 70 of the air bag 14, but can alternatively be secured to another portion of the air bag, such as the top portion 76 or side portion (not shown) of the air bag.

The tether 150 comprises a length of tether material that includes a first, trigger tether 152 and a second, vent tether 154. The trigger tether 152 Is connected to the air bag 14, for example, to a mid or lower portion 80 of a front panel 74 of the air bag presented towards the occupant 20. The vent tether 154 is connected to the vent 100 and is operative to actuate the vent in response to vehicle and occupant conditions at the time the air bag 14 is deployed. The vent tether 154 and trigger tether 152 are integrally formed together in a unitary structure to define a single length of material.

Both the trigger tether 152 and the vent tether 154 are also connected to structure adjacent the steering wheal 38 by a releasable connection 158 at a generally middle portion 156 of the tether 150. The middle portion 156 could, for example, be secured to the air bag 14 or to structure of the vehicle 12, such as the air bag module 30, e.g., the housing 34, or the steering wheel 38. In the embodiment illustrated in FIGS. 1-3, the middle portion 156 is secured to the air bag 14 by the connection 158 at a rear panel 90 of the air bag where the bag is secured to the housing 34. The connection 158 can be directly connected to the rear panel 90 or indirectly connected to an extension 91 of the rear panel.

Figure 4:
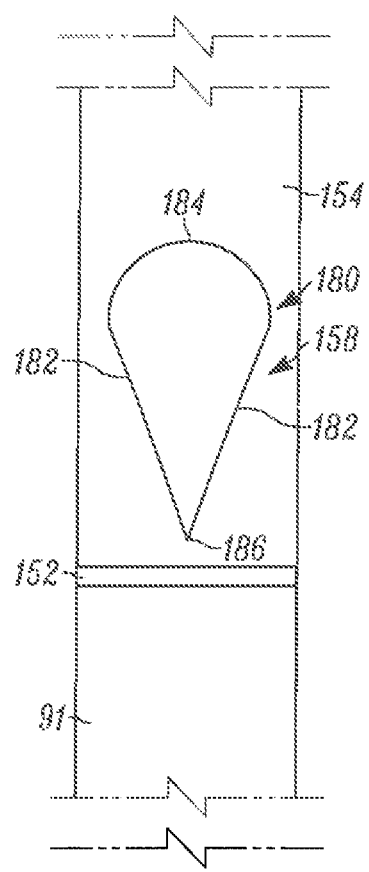
FIGS. 4 and 5 are schematic illustrations of a releasable connection of the apparatus of FIGS. 1-3.
Figure 5:
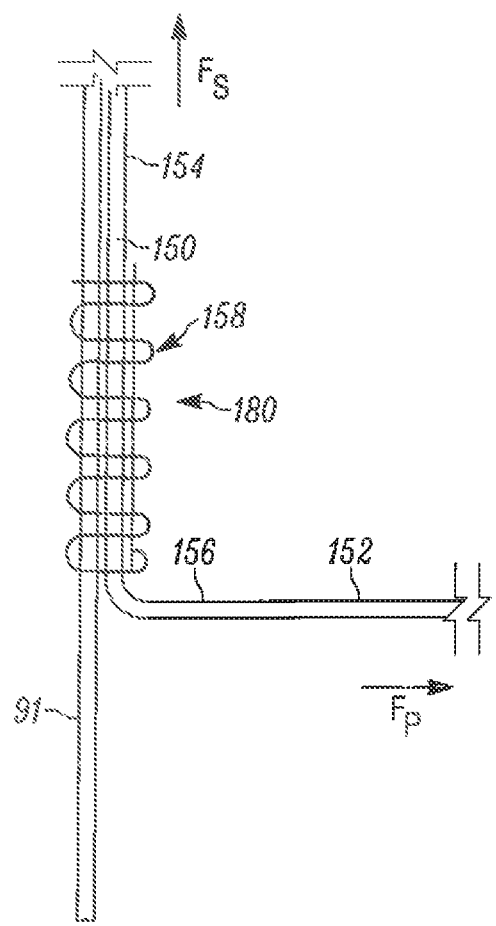

In one example shown in FIGS. 4-5, the releasable connection 153 comprises releasable tear stitching 180. The releasable connection 153 could, however, have alternative constructions, e.g., a releasable bonding agent, such as an adhesive or tape, or a releasable mechanical device, such as a rivet or staple (not shown).

According to the present invention, a rupturable tear stitch 180 configuration that promotes predictability, repeatability, and reliability in releasing interconnected fabrics is used to form the tear stitching. Referring to FIGS. 4 and 5, the tear stitching 130 has a teardrop-shaped configuration with outwardly diverging segments 182 or lags connected by a round or curved segment 184. The diverging segments 182 originate from a common break point 186. Other shapes for the tear stitching 180, however, are also contemplated.

The tear stitching 130 is configured to rupture in response to tension applied to the trigger tether 152 during deployment of the air bag 14. According to the present invention, the tear stitching 180 is adapted to selectively release the connection 153 between the trigger tether 152, vent tether 154, and the rear panel 90 of the air bag 14 depending on conditions in the vehicle 12 when the air bag is deployed.

The air bag 14 and tether 150 are constructed and arranged such that the amount of tension sufficient to rupture the tear stitching 180 differs between the trigger tether 152 and vent tether 154. Tension $F_s$ applied to the tear stitching 180 by the vent tether 154 acts generally parallel to the rear panel 90, thereby acting on the tear stitching in shear. This helps distribute the tension force over the components 90, 152,154 held together of the tear stitching 180. The tear stitching 180 therefore offers a relatively high resistance to rupture in response to tension $F_s$ applied by the vent tether 154 (referred to herein as "shear strength").

On the other hand, tension $F_p$ applied to the tear stitching 130 by the trigger tether 152 acts at an angle relative to the rear panel 90 and therefore produces a "peeling" force or action between the trigger tether and rear panel. This peeling action helps focus the tension $F_p$ on the break point 186 of the tear stitching 180. The degree of peeling force $F_p$ depends on the angle between the trigger tether 152 and the rear panel 90. As shown, tension pulling the trigger tether 152 is substantially perpendicular to the plane of the stitching 180, thereby producing a pulling force $F_p$ that is the strongest and the most focused at the break point 186.

Due to the strength and focusing properties of the peeling force $F_p$ applied by the trigger tether 152 to the tear stitching 180, the tear stitching thereby offers a relatively lower resistance to rupture in response to tension applied by the trigger tether (referred to herein as "peel strength"). The tear stitching 180 can therefore have a relatively high shear strength and a correspondingly low peel strength.

Because of this, the rupture strength of the tear stitching 180 can be selected to have a desired combination of peel strengths. This can be achieved, for example, through the careful selection of the thread material, stitch pattern, number of stitches, and/or thread pattern for the tear stitching 180. For instance, in one embodiment, the tear stitching 180 can have a peel strength selected such that the tear stitching ruptures In response to a force of about 100 Newtons applied via the trigger tether 162. In contrast, this same tear stitching 180 can also have a shear strength selected such that the tear stitching is capable of withstanding a force of about 2000 Newtons applied via the vent tether 154.

Due to this construction, the tear stitching 180 is much more likely to rupture due to peeling forces $F_p$ applied by the trigger tether 152 during deployment of the air bag 14 than shear forces $F_s$ applied by the vent tether 154 during the same deployment. In other words, the tear stitching 180 will only rupture in response to forces applied to the tear stitching by the tensioning trigger tether 152 during air bag 14 deployment.

The tether 150 of the present invention is configured to actuate the vent 100 when the air bag 14 deploys less than a predetermined degree or amount and is prevented from actuating the vent when the air bag deploys the predetermined degree, in particular, the tether 150 is configured such that the trigger tether 152 is only capable of fully tensioning and applying the peeling force $F_p$ to the tear stitching 180 sufficient to rupture the tear stitching when, and only when, the air bag 14 is permitted to folly deploy. To this end, the trigger tether 152 is afforded enough slack prior to air bag 14 deployment to help ensure the trigger tether does not prematurely apply tension to the fear stitching 180.

Those skilled in the art will appreciate that, in response to full deployment of the air bag 14, tension will be applied to the tear stitching 180 in peel by the trigger tether 152. As a result, the peeling action focuses the tension on the break point 188. When tension on the trigger tether 152 exceeds the peel strength, the tear stitching 180 ruptures, beginning at the break point 186. The rupture then travels along the segments 182 until the trigger tether 152, vent tether 154, and rear panel 90 are released from each other.

When the air bag 14 Is prevented from fully deploying, the trigger tether 152 remains slackened and the vent tether 154 tensions to apply shear forces $F_s$ to the tear stitching 180, which are insufficient to rupture the tear stitching. To this end, the vent tether 154 can be shorter than the trigger tether 154 to help ensure rapid response (tensioning) to less than full deployment of the air bag 14. The connection between the trigger tether 152, vent tether 154, and rear panel 90 relies on the shear strength of the tear stitching 180. The shear strength of the tear stitching 180 can therefore be configured to withstand the force of inflation and deployment of the air bag 14. Consequently, the tear stitching 180 remains intact throughout deployment of the air bag 14 when the air bag is prevented from reaching full deployment.

When an event occurs which inflation of the air bag 14 is desired, the adaptive tether 150 respond to vehicle conditions, occupant conditions, or both to help control inflation and deployment of the air bag via the vent 100. According to the embodiment of FIGS. 1-6B, this control is implemented passively based on the fore-aft position of the occupant 20 or 20a in the vehicle 12.

Referring to FIGS. 1-2, the occupant 20 is positioned away from the steering wheel 38 and therefore relatively far from to the air hag module 30. This can be the case, for example, with a relatively large occupant 20, such as an adult male occupant. For reference, a small occupant 20a such as a child or small female occupant in a forward seat position is illustrated in dashed lines in FIG. 1. Those skilled in the art will appreciate that the larger occupant 20 can adjust the vehicle seat 22 to a position rearward of the seat of the smaller occupant 20a.

Upon sensing the occurrence of an event for which occupant protection is desired, the inflator 30 is actuated and the air bag 14 deployed out of the steering wheel 38 towards the occupant 20. As the front panel 74 of the air bag 14 moves toward the occupant 20 the trigger tether 152 begins to tension, thereby applying a tension or force upon the tear stitching 180. Due to the positioning of the occupant 20 (FIG. 2) further from the steering wheel 38 the front panel 74 is permitted to move to a position that fully tensions the trigger tether 152. Since, as described above, the tear stitching 180 has a relatively low peel strength configured to rupture under relatively low tension forces between the trigger tether 152 and the rear panel 90, the tear stitching ruptures in the event of the rearward positioned occupant 20 of FIG. 2. As a result, the vent tether 154 remains slackened and the vent 100 unactuated as the air bag 14 continues to deploy. Since the vent 100 in the embodiment of FIGS. 1-3 has a normally closed configuration, its non-actuation prevents inflation fluid from exiting the inflatable volume 54 and allows the air bag to inflate to the fully deployed position illustrated in FIG. 2. The larger air beg 14 inflation volume desirably provides larger restraint forces for the relatively large occupant 20.

Referring to FIG. 3, the occupant 20a is positioned relatively close to the steering wheel 38 and therefore relatively close to the air bag module 30. This can be the case, for example, with a relatively small occupant 20a, such as a child or small female occupant. Those skilled in the art will appreciate that the smaller occupant 20a can adjust the vehicle seat 22 to a position forward of the seat of the larger occupant 20 (see FIG. 1).

According to the present invention, the air bag 14 in FIG. 3 is prevented from fully deploying when a small occupant 20a is positioned in the vehicle seat 22 closer to the steering wheel 38. As a result, the front panel 74 is prevented from reaching the fully deployed condition and, thus, the trigger tether 152 does not fully tension, leaving the tear stitching 180 intact.

Although the air bag 14 Is prevented from fully deploying towards the occupant 20a, the top portion 76 of the air bag—having the vent 100 and vent tether 154 secured thereto—is permitted to continue deploying outwards. This causes the vent tether 154 to tension and apply a tension or force upon the tear stitching 180. Since, as described above, the tear stitching 180 has a relatively high shaping strength configured to withstand relatively high tension forces between the vent tether 154 and rear panel 60, the tear stitching does not rupture in the event of the forward positioned occupant 20a of FIG. 3. As a result, the vent tether 154 folly tensions with the deploying top portion 76 and actuates the vent 100. Since the vent 100 in the embodiment of FIGS. 1-3 has a normally closed configuration, its actuation results in the vent being placed in the open condition venting inflation fluid from the inflatable volume 54 of the air bag 14. The resulting smaller air bag 14 inflation volume desirably provides reduced restraint forces for the relatively smaller occupant 20a.

In view of the above, those skilled in the art will appreciate that, according to the present invention, the adaptive tether 150 is configured to cause inflation fluid venting in response to restricted deployment of the air bag 14, and is configured to block inflation fluid venting in response to foil deployment of the air bag. Those skilled in the art will appreciate that the adaptive tether 150 and vent 100 could be arranged such that the reverse is true, i.e., such that inflation fluid vents in response to full deployment and inflation fluid venting is blocked in response to restricted deployment.

Referring to FIGS. 8A-8C, according to an embodiment of the invention, the vent 100 comprises a vent 102 for venting inflation fluid from the air bag 14. The vent 102 includes a pair of flaps or portions 104 that overlap one another and the vent opening 204 in the panel 206. Each vent flap 104 is secured to the panel 206 outside the inflatable volume 54 with stitching 108 that remains intact throughout deployment of the air bag 14. Each vent flap 104 includes an extension 103 extending through the vent opening 204 into the inflatable volume 54. The vent lather 154 is positioned within the inflatable volume 54 overlying the inside of the panel 206. Rupturable tear stitching 181 extends through the vent tether 154, panel 206; and both extensions 108 to secure the same together. The tear stitching 181 can have the same configuration as the tear stitching 180. While the stitching 181 is intact, the extensions 108 cooperate with the vent tether 164 to prevent inflation fluid from exiting the air bag 14 through the vent opening 204.

Figure 6C:
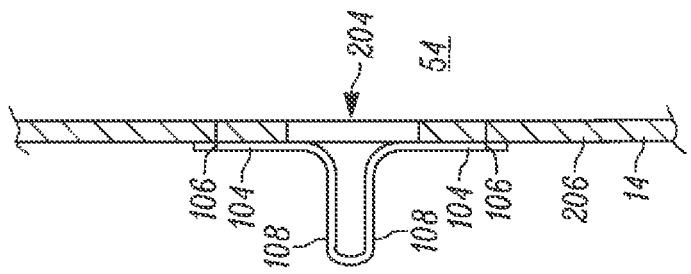
Figure 6B:
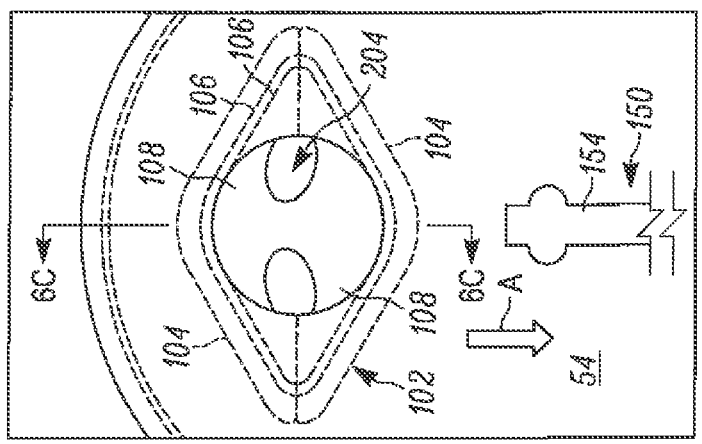
Figure 6A:
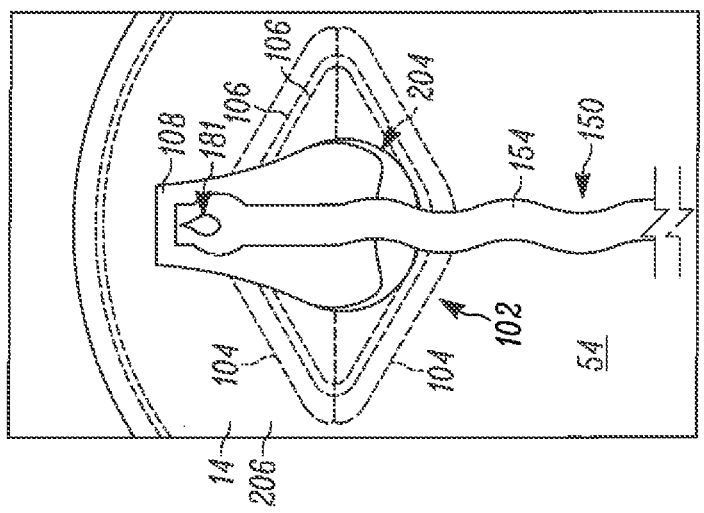

The vent 102 of FIGS. 6A-6C has a normally closed construction. Referring to FIG. 6A, when the occupant 20 is a rearward positioned occupant so as to permit the air bag 14 to fully inflate and deploy as described above in regard to FIGS. 1-3, the trigger tether 152 fully tensions to rupture the fear stitching 180 (not shown). As a result, the vent tether 154 is slackened and, thus, the vent tether is prevented from rupturing the tear stitching 181 and actuating the vent 102. Since the vent 102 has a normally closed configuration, its non-actuation results in the vent remaining closed. Therefore, in the case of the rearward positioned large occupant 20, the vent 102 blocks inflation fluid from venting out of the air bag 14 through the vent opening 204.

Referring to FIGS. 6B and 6C, when the occupant is a forward positioned occupant 20a the trigger tether 162 is prevented from folly tensioning and, thus, the tear stitching 180 remains intact. Consequently, the vent tether 154 fully tensions to rupture the tear stitching 181, detach from the extensions 108, and move away from the vent opening 204 in the direction indicated generally by the arrow A, to actuate the vent 102. Rupturing the tear stitching 181 allows the extensions 108 of the vent flaps 104 to pass through the vent opening 204 and away from the panel 206 in response to inflation fluid pressure. This allows inflation fluid to exit the inflatable volume 54 through the opening 204. Since the vent 102 has a normally dosed configuration, its actuation results in the vent being opened, as shown in FIGS. 6B and 6C. Therefore, in the case of the forward positioned small occupant 20a, the vent 102 vents inflation fluid from the air bag 14 through the vent opening 204.

Figure 7A:
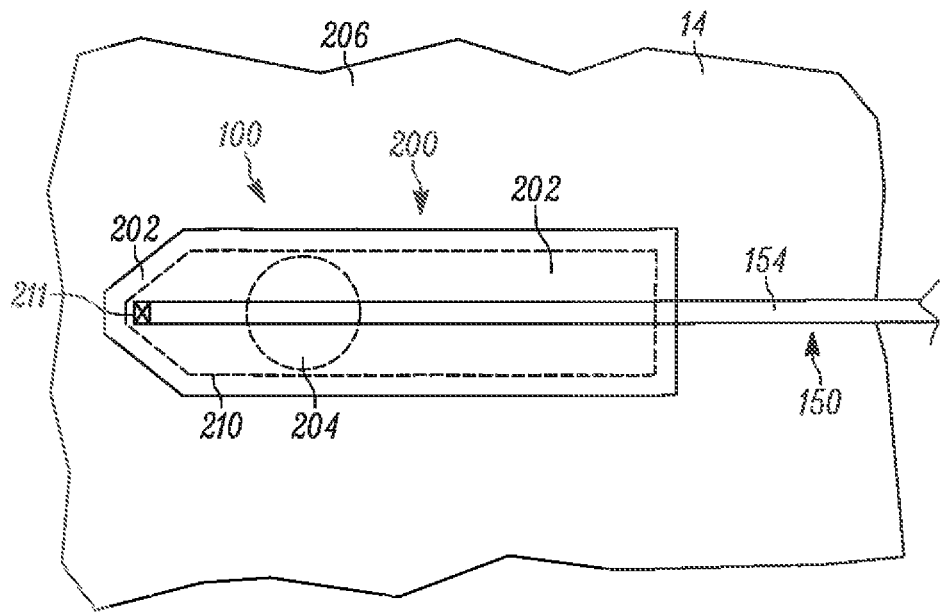
FIGS. 7A-7B are schematic illustrations of an alternative vent configuration of the apparatus of FIGS. 1-3 in different conditions.
Figure 7B:
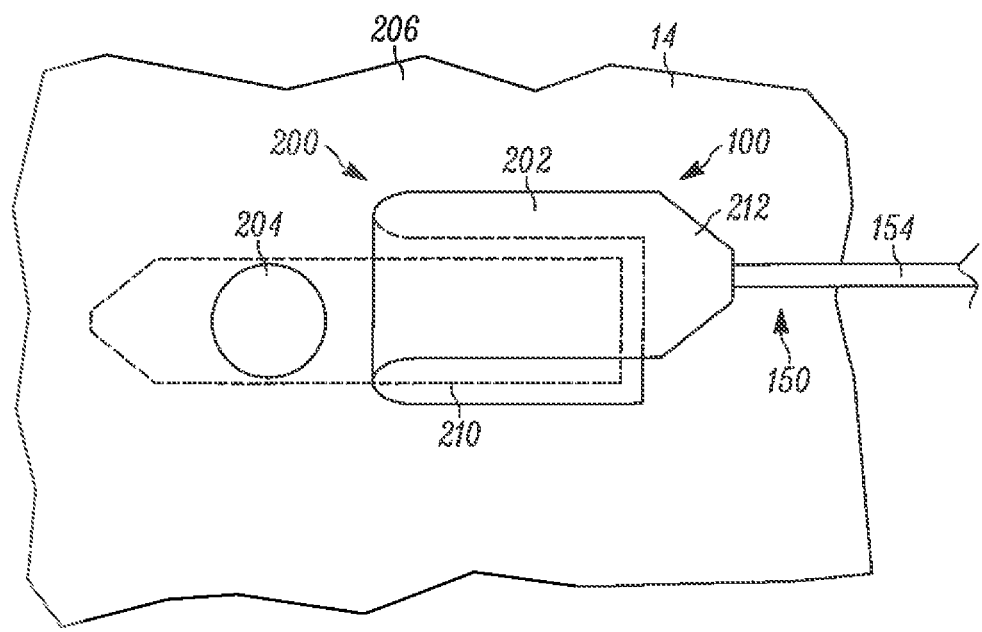

Referring to FIGS. 7A-7B, according to another embodiment of the invention, the vent 100 comprises a vent 200 for venting inflation fluid from the air bag 14. The vent 200 includes a vent door 202 and a vent opening 204 in a panel 206 of the air bag, such as a rear panel 90, a top panel or side panel (not shown). The vent door 202 is secured to the panel 206 by a releasable connection 210, such as tear stitching or an adhesive. In the embodiment of FIGS. 7A and 78, the vent door 202 is secured to the panel 206 by rupturable tear stitching 210. The portion of the adaptive tether 150 comprising the vent tether 154 is secured to a tapered end portion 212 of the vent door 202 via stitching 211. The vent tether 154 extends along the vent door 202 and across the vent opening 204 to its releasable connection 158 (not shown) with the air bag 14.

The vent 200 of FIGS. 7A and 7B has a normally closed construction. Referring to FIG. 7A, when the occupant 20 is in a rearward position so as to permit the air bag 14 to fully inflate and deploy as described above in regard to FIGS. 1-3, the trigger father 152 fully tensions to rupture the tear stitching 180. As a result, the vent tether 154 remains slackened and, thus, the vent tether is prevented from rupturing the tear stitching 210 to actuate the vent 200. Since the vent 200 has a normally closed configuration, its non-actuation results in the vent remaining closed. Therefore, in the case of the rearward positioned large occupant 20, the vent 200 blocks inflation fluid from venting out of the air bag 14 through the vent opening 204.

Referring to FIG. 7B, when the occupant is a forward positioned occupant 20a the trigger tether 152 is prevented from fully tensioning and, thus, the tear stitching 180 remains intact. Consequently, the vent tether 154 fully tensions to rupture the tear stitching 210 and actuate the vent 200. Since the vent 200 has a normally closed configuration, its actuation results in the vent being pulled open, as shown in FIG. 7B. Therefore, in the case of the forward positioned small occupant 20a, the vent 200 vents inflation fluid from the air bag 14 through the vent opening 204.

Referring to FIGS. 8A-8C, according to another embodiment of the invention, the vent 100 includes a vent 250 for venting inflation fluid from the air bag 14. The vent 250 constitutes a vent door folded over itself to form overlapping first and second portions 252, 258. The first and second portions 252, 258 have a triangular or polygonal (not shown) shape and are generally concentric with one another. As shown, the first portion 252 includes a pair of sidewalls 254 on opposing sides of the second portion 258. One or more vent openings 260 extend through the first portion 252. The vent openings 260 can have any shape, configuration or pattern.

The first and second portions 252, 258 overlay one another to form a loop 262 at a location on the vent door opposite the openings 260. The loop 262 receives the vent tether 154 for actuating the vent 250. The first portion 252 is secured to the inside of the panel 206 within the inflatable volume 54 by a connection (not shown), such as stitching or an adhesive that remain intact throughout deployment of the air bag 14. In this configuration, the openings 260 are aligned with the vent opening 204 in the panel 206. The first portion 252 is secured to the panel 206 such that the second portion 258 is positioned between the panel and the first portion and the vent openings 260 are aligned with the opening 204 in the panel 206. The second portion 253 is secured to the first portion 252 by rupturable tear stitching 253.

The vent 250 of FIGS. 8A and 8B has a normally closed construction. Referring to FIG. 8A, when the occupant 20 is a rearward positioned occupant so as to permit the air bag 14 to fully inflate and deploy as described above in regard to FIGS. 1-3, the trigger tether 152 fully tensions to rupture the tear stitching 180. As a result, the vent tether 154 remains slackened and, thus, the vent tether is prevented from folly tensioning to rupture the tear stitching 253 and actuate the vent 250. Since the vent 250 has a normally closed configuration, its non-actuation results in the vent remaining closed. Therefore, in the case of the rearward positioned large occupant 20, the vent 250 blocks inflation fluid from venting out of the air bag 14 through the vent openings 260 and opening 204.

Referring to FIG. 8B, when the occupant is a forward positioned occupant 20a the trigger tether 152 is prevented from fully tensioning and thus, the tear stitching 180 remains intact. Consequently, the vent tether 154 fully tensions to rupture the tear stitching 253 and actuate the vent 200. Since, the vent 250 has a normally closed configuration, its actuation results in the vent being pulled open, as shown in FIG. 8B. Therefore, in the case of the forward positioned small occupant 20a, the vent 250 vents inflation fluid from the air bag 14 through the aligned vent openings 204, 260.

Figure 9A:
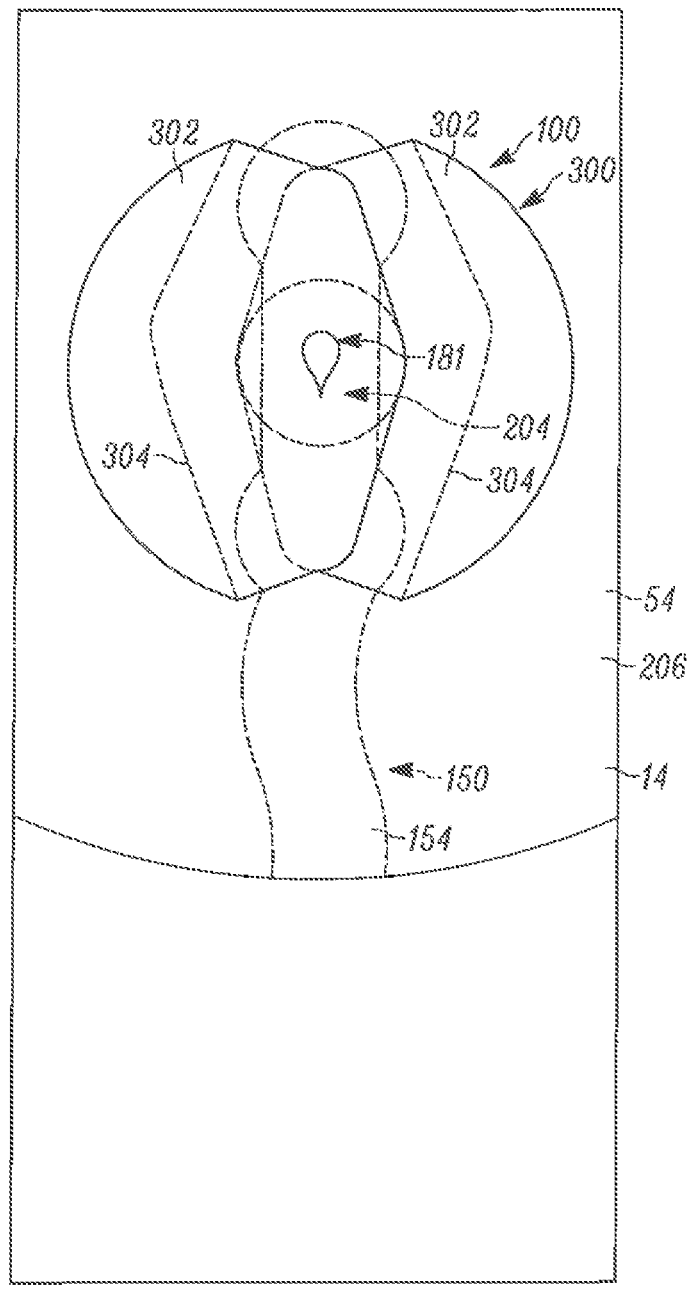
FIGS. 9A and 9B are schematic illustrations of an alternative vent configuration of the apparatus of FIGS. 1-3 in different conditions.
Figure 9B:
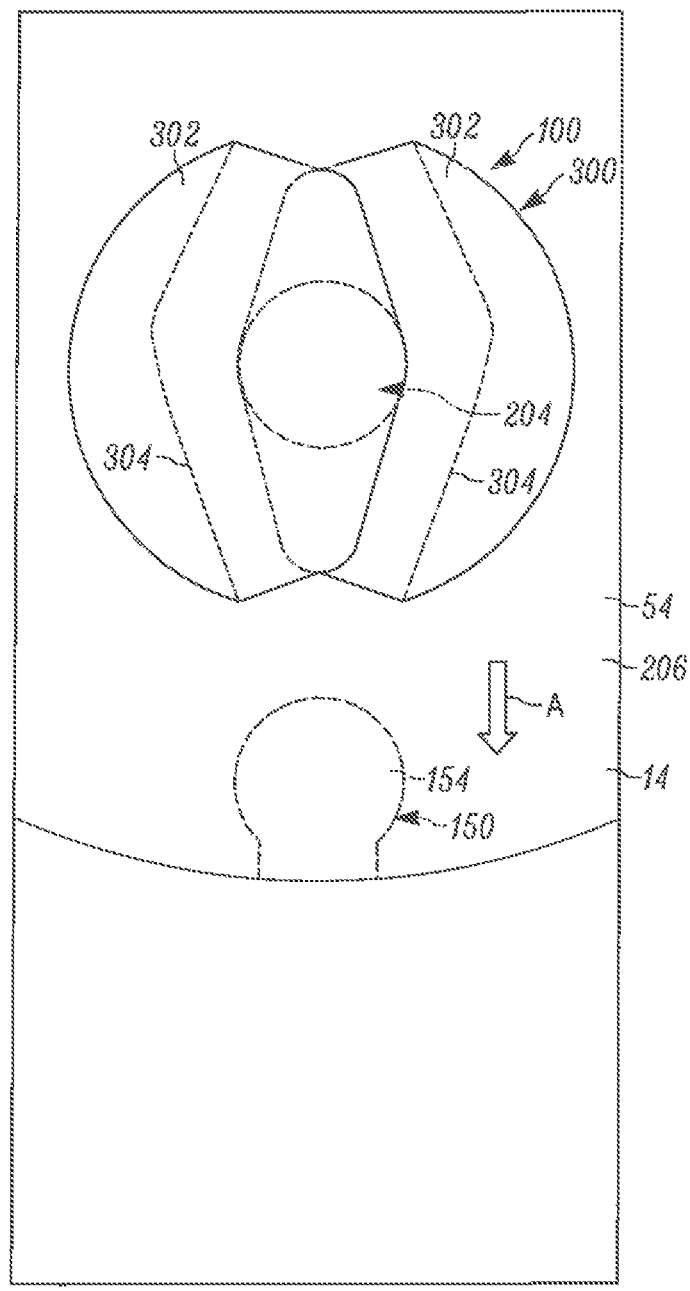

Referring to FIGS. 9A and 9B, according to another embodiment of the invention, the vent 100 comprises a vent 300 for venting inflation fluid from the air bag 14. The vent 300 includes a pair of flaps or portions 302 that overlap one another and the vent opening 204 in the panel 206. Each vent flap 302 is secured to the panel 206 outside the inflatable volume 54 with stitching 304 that remains intact throughout deployment of the air bag 14. The vent tether 154 is positioned within the inflatable volume 54 overlying the inside of the panel 206 and covering the vent opening 204. Rupturable tear stitching 181 extends through the vent tether 154, panel 206, and vent flaps 302 to secure the same together. The tear stitching 181 can have the same configuration as the tear stitching 180. While the stitching 131 is intact, the flaps 302 cooperate with the vent tether 154 to prevent inflation fluid from exiting the air bag 14 through the vent opening 204.

The vent 300 of FIGS. 9A and 9B has a normally closed construction. Referring to FIG. 9A, when the occupant 20 is a rearward positioned occupant so as to permit the air bag 14 to fully inflate and deploy as described above In regard to FIGS. 1-3, the trigger tether 152 fully tensions to rupture the tear stitching 180 (not shown). As a result, the vent tether 154 is slackened and, thus, the vent tether is prevented from rupturing the tear stitching 181 and actuating the vent 300. Since the vent 300 has a normally closed configuration, its non-actuation results in the vent remaining closed. Therefore, in the case of the rearward positioned large occupant 20, the vent 300 blocks Inflation fluid from venting out of the air bag 14 through the vent opening 204.

Referring to FIG. 9B, when the occupant is a forward positioned occupant 20a the trigger tether 152 is prevented from fully tensioning and, thus, the tear stitching 180 remains intact. Consequently, the vent tether 154 fully tensions to rupture the tear stitching 131, detach from the flaps 302, and move away from the vent opening 204 in the direction indicated generally by the arrow A, to actuate the vent 300. Rupturing the tear stitching 181 allows the vent flaps 302 to move outward from the panel 206 in response to inflation fluid pressure. This allows inflation fluid to exit the inflatable volume 54 through the opening 204. Since the vent 300 has a normally closed configuration, its actuation results in the vent being opened, as shown in FIG. 9B. Therefore, in the case of the forward positioned small occupant 20a, the vent 300 vents inflation fluid from the air bag 14 through the vent opening 204.

Figure 10A:
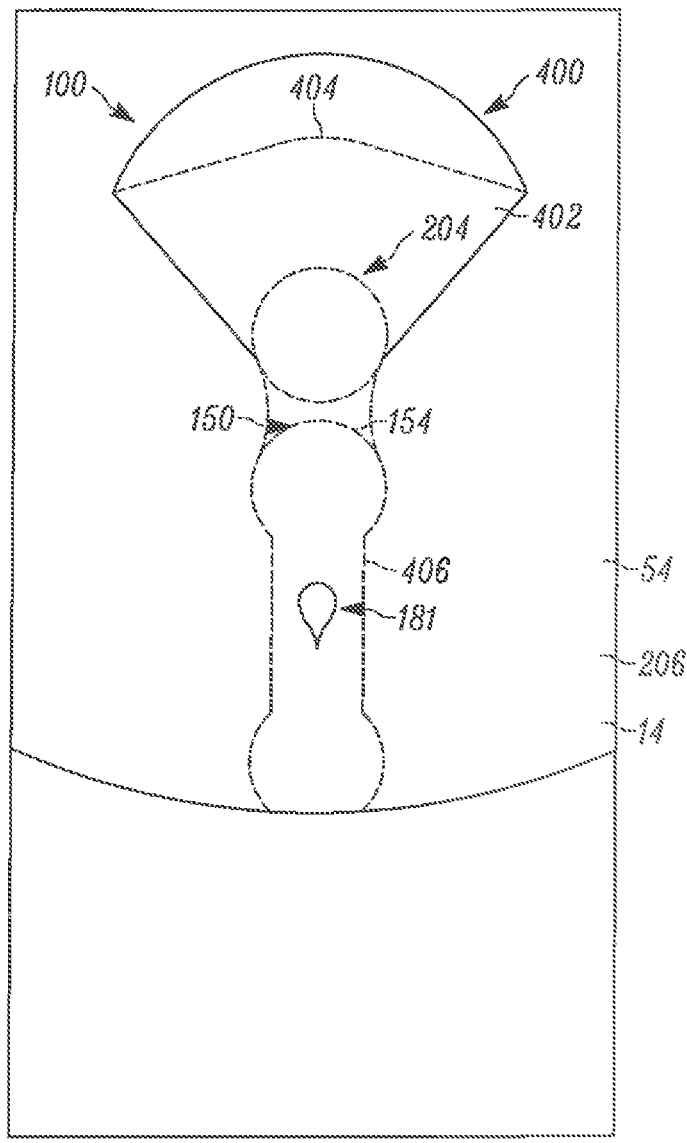
FIGS. 10A and 10B are schematic illustrations of an alternative vent configuration of the apparatus of FIGS. 1-3 in different conditions.
Figure 10B:
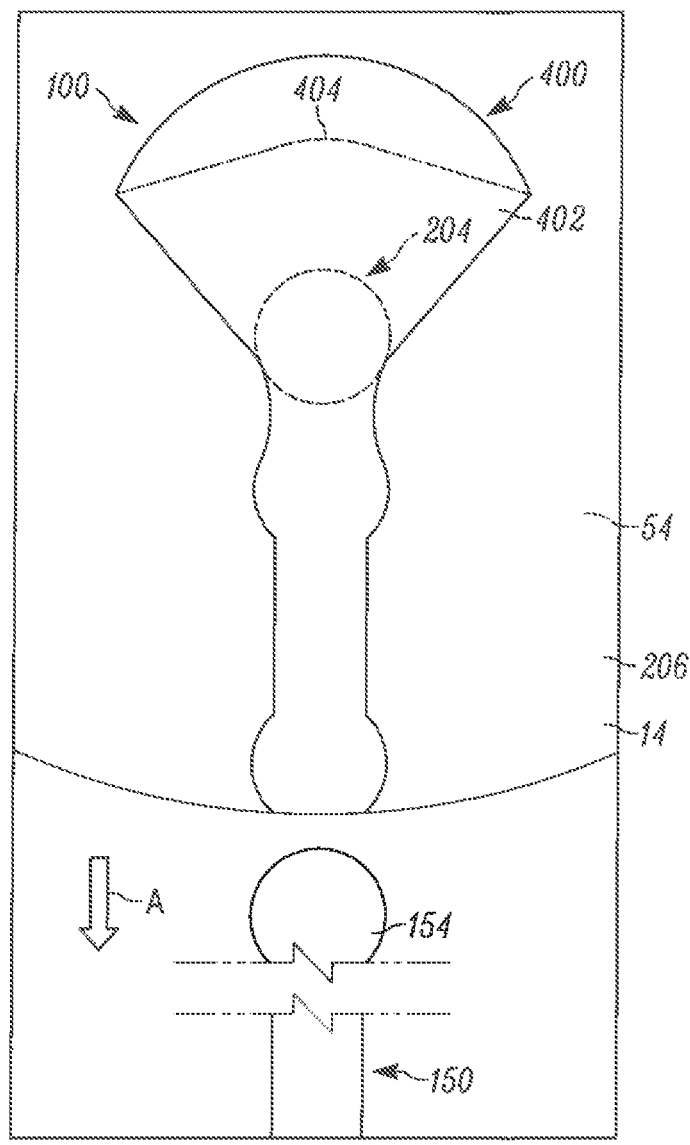

Referring to FIGS. 10A and 10B, according to another embodiment of the invention, the vent 100 comprises a vent 400 for venting inflation fluid from the air bag 14. The vent 400 includes a flap 402 secured to the panel 206 outside the inflatable volume 54 with stitching 404 such that the flap overlaps and covers the vent opening 204. The stitching 404 remains intact throughout deployment of the air bag 14. An extension 406 of material extends from the flap 402, through the vent opening 204, and along the inferior of the panel 206 within the inflatable volume 54. The vent tether 154 also extends along the interior of the panel 206 and overlies the extension 406. Rupturable tear stitching 181 extends through the vent tether 154, extension 406, and panel 206 to secure the same together. While the stitching 181 is intact, the extension 406 and flap 402 prevent inflation fluid from passing through the vent opening 204.

The vent 400 of FIGS. 10A and 108 has a normally closed construction. Referring to FIG. 10A, when the occupant 20 is a rearward positioned occupant so as to permit the air bag 14 to fully inflate and deploy as described above in regard to FIGS. 1-3, the trigger tether 152 fully tensions to rupture the tear stitching 180 (not shown). As a result, the vent tether 154 is slackened and, thus, the vent tether is prevented from rupturing the tear stitching 131 and actuating the vent 300. Since the vent 400 has a normally closed configuration, its non-actuation results in the vent remaining closed. Therefore, in the case of the rearward positioned large occupant 20, the vent 400 blocks inflation fluid from venting out of the air bag 14 through the opening 204.

Referring to FIG. 10B, when the occupant is a forward positioned occupant 20a the trigger tether 152 is prevented from fully tensioning and, thus, the tear stitching 180 remains intact. Consequently, the vent tether 154 fully tensions to rupture the tear stitching 181, detach from the extension 406, and move away from the vent opening 204 and the extension in the direction A. Rupturing the tear stitching 181 therefore allows the extension 406 and flap 402 to move relative to the panel 206, thereby allowing the flap 402 to move outward from the panel in response to Inflation fluid pressure. This allows Inflation fluid to exit the inflatable volume 54 through the vent opening 204. Since the vent 400 has a normally closed configuration, its actuation results in the vent being opened, as shown in FIG. 10B. Therefore, in the case of the forward positioned small occupant 20a, the vent 400 vents inflation fluid from the air bag 14 through the vent opening 204.

Figure 11A:
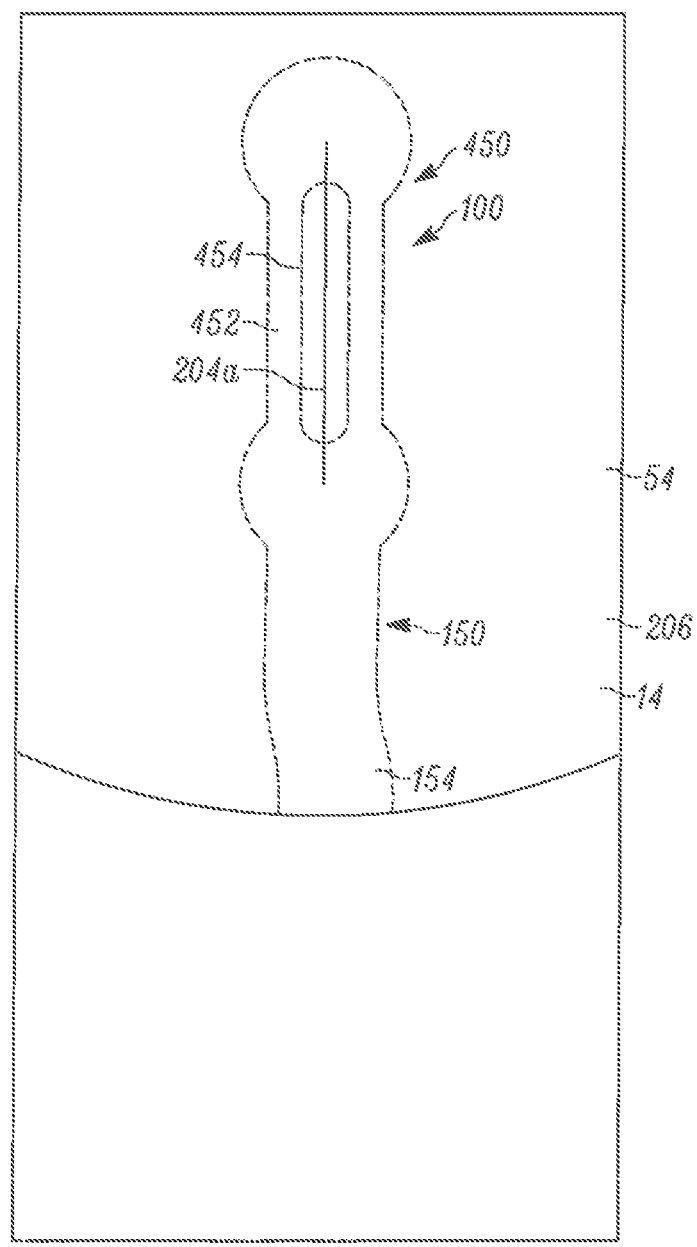
FIGS. 11A and 11B are schematic illustrations of an alternative vent configuration of the apparatus of FIGS. 1-3 in different conditions.
Figure 11B:
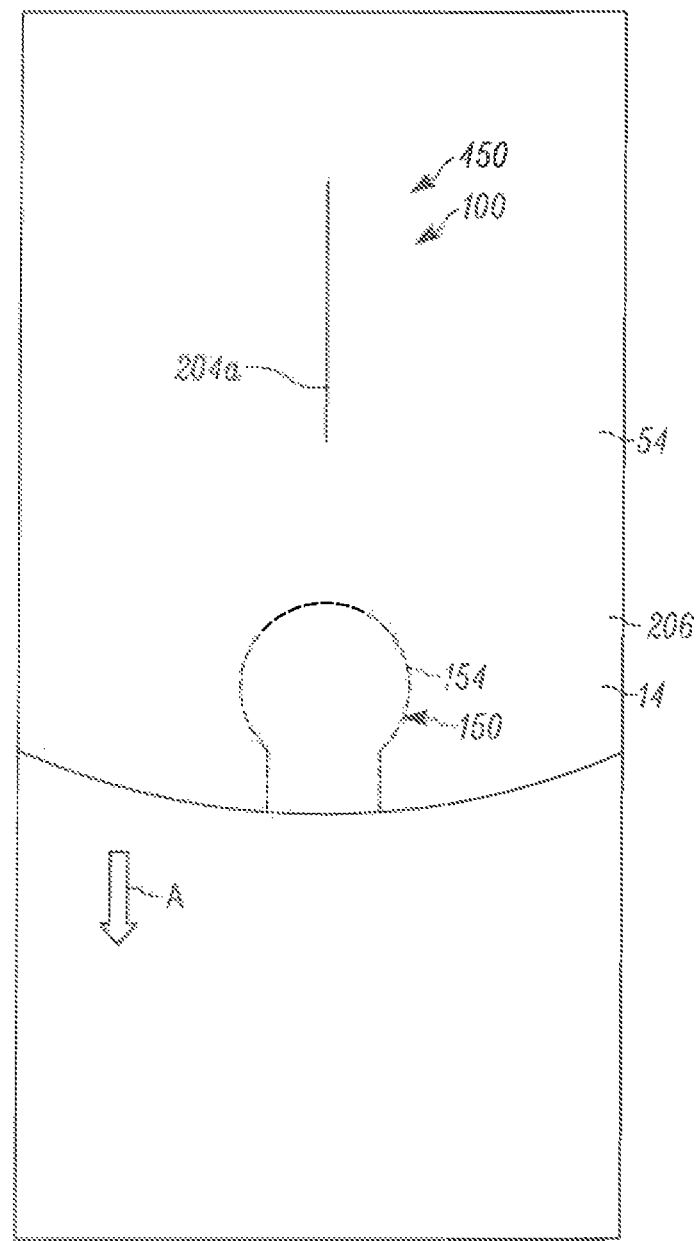
Figure 12:
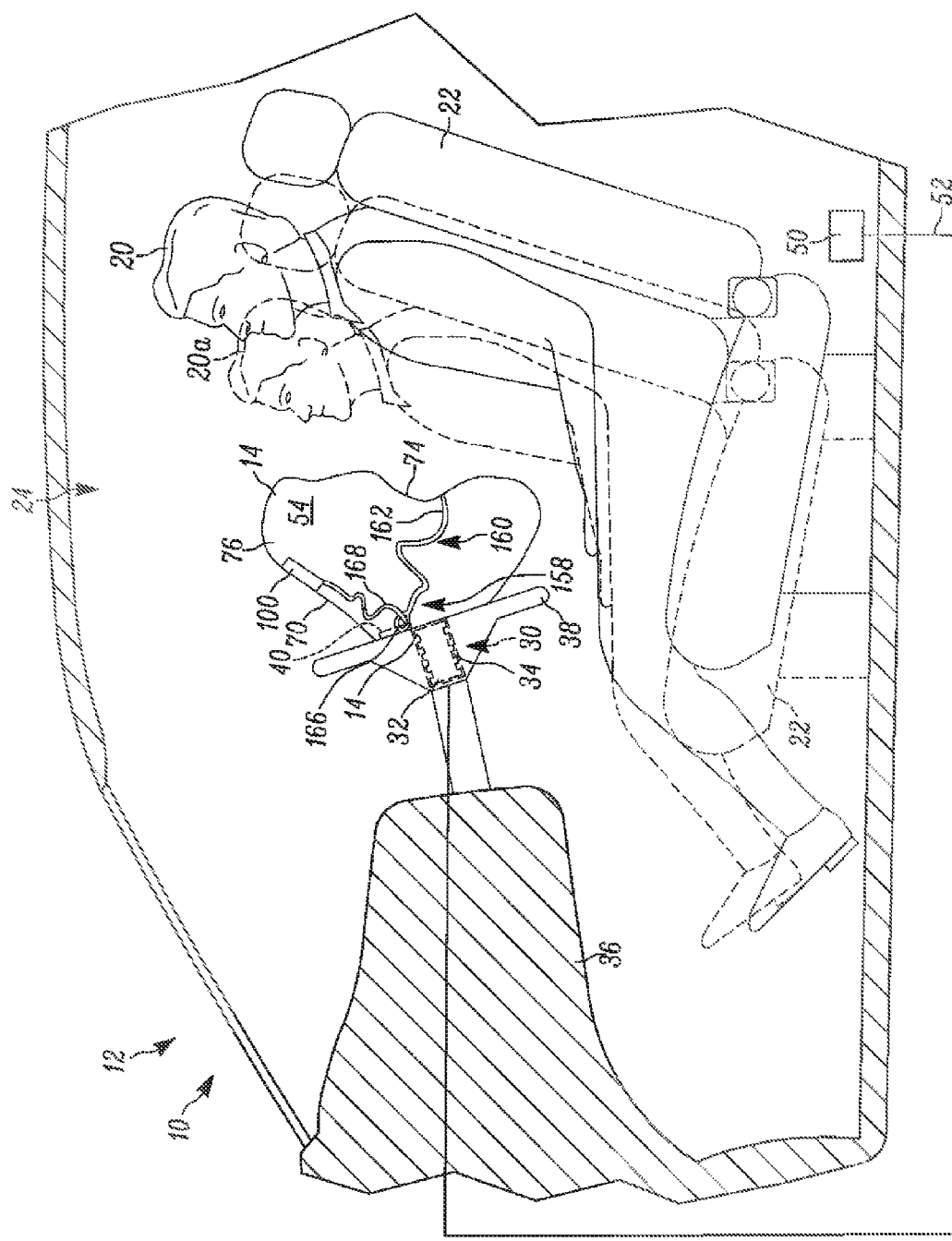
FIG. 12 is a schematic side view illustrating another embodiment of an apparatus for helping to protect an occupant of a vehicle.

Referring to FIGS. 11A and 11B, according to another embodiment of the invention, the vent 100 comprises a vent 450 for venting inflation fluid from the air bag 14. The terminal end of the vent tether 154 forms a flap 452 secured to the panel 206 within the inflatable volume 54 and overlying and covering the vent opening 204a. In this example, the vent opening 204a can constitute a silt or slot formed in the panel 208. Rupturable tear stitching 454 is used to secure the flap 452 over the vent opening 204a. As shown, the tear stitching 454 has an oval shape extending along the length of the vent opening 204a and substantially encircling the same. While the tear stitching 454 is intact, the flap 452 on the vent tether 154 prevents inflation fluid from passing through the vent opening 204a.

The vent 460 of FIGS. 11A and 11B has a normally closed construction. Referring to FIG. 11A, when the occupant 20 is a rearward positioned occupant so as to permit the air bag 14 to fully inflate and deploy as described above in regard to FIGS. 1-3, the trigger tether 152 fully tensions to rupture the tear stitching 180 (not shown). As a result, the vent tether 154 is slackened and, thus, the vent tether is prevented from rupturing the tear stitching 454 and actuating the vent 450. Since the vent 450 has a normally closed configuration, its non-actuation results in the vent remaining closed. Therefore, in the case of the rearward positioned large occupant 20, the vent 450 blocks inflation fluid from venting out of the air bag 14 through the opening 204a.

Referring to FIG. 11B, when the occupant is a forward positioned occupant 20a the trigger tether 152 is prevented from fully tensioning and, thus, the tear stitching 180 remains intact. Consequently, the vent tether 154 fully tensions to rupture the tear stitching 454, detach from the panel 206, and move away from the vent opening 204a in the direction A. This uncovers the vent opening 204a to allow inflation fluid to exit the inflatable volume 54 therethrough. Since the vent 450 has a normally closed configuration, its actuation results in the vent being pulled open, as shown in FIG, 11B. Therefore, in the case of the forward positioned small occupant 20a, the vent 450 vents inflation fluid from the air bag 14 through the vent opening 204a.

FIGS. 12-15 illustrate an alternative tether and releasable connection between the tether and air bag in accordance with the present invention. In the embodiment of FIGS. 12-15, the tether comprises a two-piece tether 160 that includes a trigger tether 162 separate from the vent tether 168. The trigger tether 162 includes a first end 164 secured to the front panel 74 and a second end 166 forming a releasable connection 158 with a structure of the vehicle on or near the steering wheel 38. The vent tether 168 includes a first end 170 secured to the vent 100 and a second end 172 connected to the second end 166 of the trigger tether 182 and the vehicle structure at the releasable connection 158.

Figure 15:
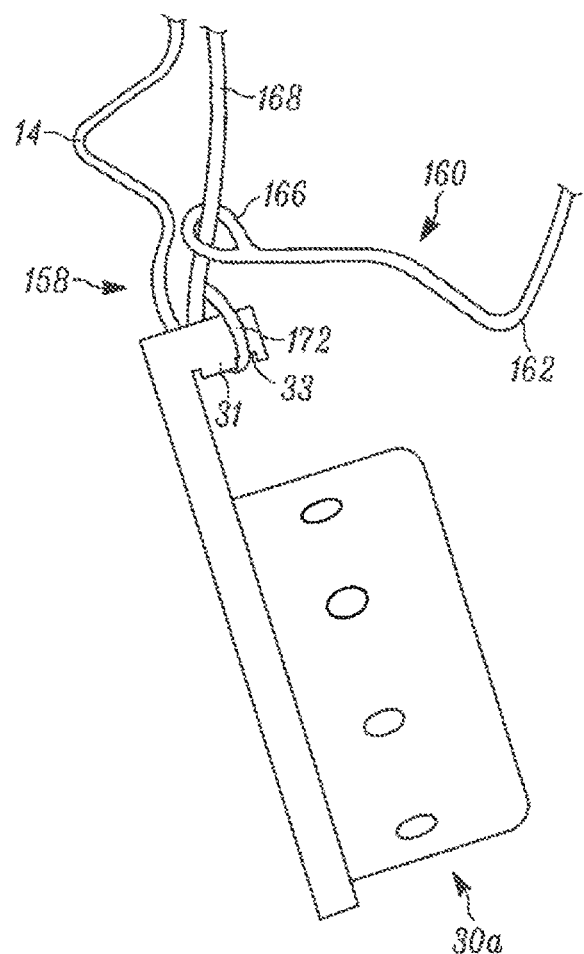
FIG. 15 Is schematic illustration of a releasable connection of the apparatus of FIGS. 12-14.

Referring to FIG. 15, the releasable connection 158 constitutes a looped connection between the inflator 30a and the second ends 166, 172 of the tethers 162, 168. More specifically, each second end 166,172 has a looped configuration connected directly or indirectly to a projection 31 extending from the inflator 30a. In one example, the projection 31 includes a notch or recess 33 for receiving the looped second end 172 of the vent tether 168, which extends through the looped second end 166 of the trigger tether 162. In other words, the vent tether 168 is directly connected to the projection 31 while the trigger tether 162 is indirectly connected to the projection. The tethers 162, 168 and projection 31 are configured such that both tethers either remain connected to the projection throughout air bag 14 inflation or both tethers are released from the projection in response to the forward or rearward position of the occupant 20, 20a.

Figure 13:
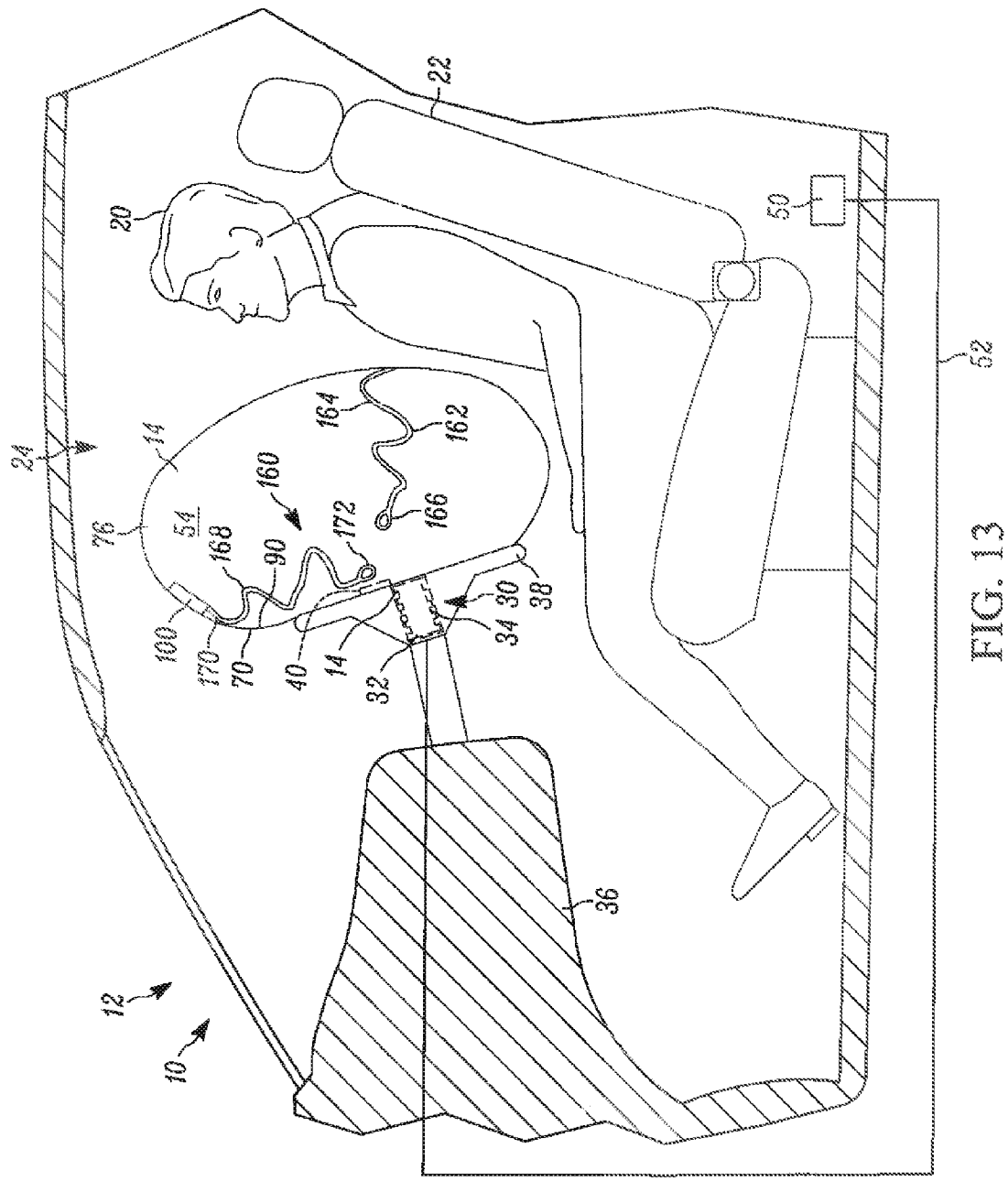
FIGS. 13 and 14 are schematic side views illustrating the apparatus of FIG. 12 in different conditions.

The vent 100 of FIGS. 12-15 can constitute any of the previously described vents 102, 200, 250, 300, 400, 450 and, thus, the vent has a normally closed construction. Referring to FIGS. 13 and 15, when the occupant 20 is a rearward positioned occupant so as to permit the air bag 14 to fully inflate and deploy as described above in regard to FIGS. 1-3, the trigger tether 162 fully tensions. As a result, the trigger tether 162 pulls the vent tether 168 out of the recess 33 and off the projection 31, thereby releasing the connection 158 between the tethers and the inflator 30a. The vent tether 168 therefore remains slackened and, thus, the vent tether is prevented from rupturing the vent tear stitching (not shown) and actuating the vent 100. Since the vent 100 has a normally closed configuration, its non-actuation results in the vent remaining closed. Therefore, in the case of the rearward positioned large occupant 20 shown in FIG. 13, the vent 100 blocks inflation fluid from venting out of the air bag 14 through the vent opening 204a.

Figure 14:
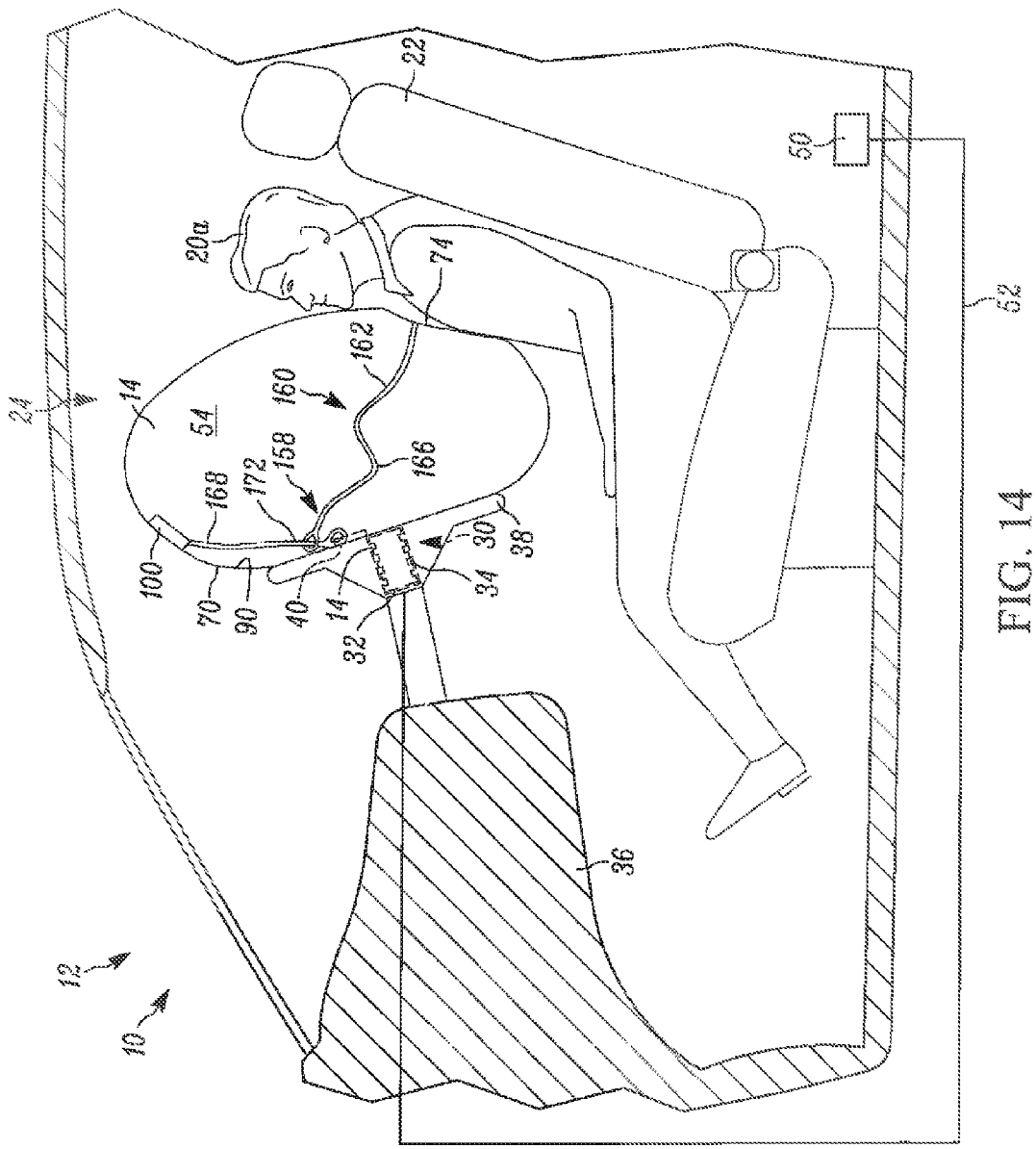

Referring to FIG. 14, when the occupant is a forward positioned occupant 20a the trigger tether 162 is prevented from fully tensioning and, thus, the trigger tether does not pull the vent tether 168 off the projection 31. In other words, the releasable connection 158 between the tethers 162, 168 and the inflator 30a remains intact. Consequently, the vent tether 168 fully tensions with the deploying air bag 14 to actuate the vent 100. Since the vent 100 has a normally closed configuration, its actuation results in the vent being pulled open. Therefore, in the case of the forward positioned small occupant 20a shown in FIG. 14, the vent 100 vents inflation fluid from the air bag 14.

Although the embodiments thus far disclosed concern the driver side 24 of the vehicle 12, those skilled in the art will appreciate that the present invention can likewise be implemented on the passenger side 26 of the vehicle. While the overall shape of a steering wheel 38 mounted air bag 14 can differ from that of an instrument panel 36 mounted air bag the basic function of the adaptive tether 150 and vent 100 are virtually identical.

Figure 17A:
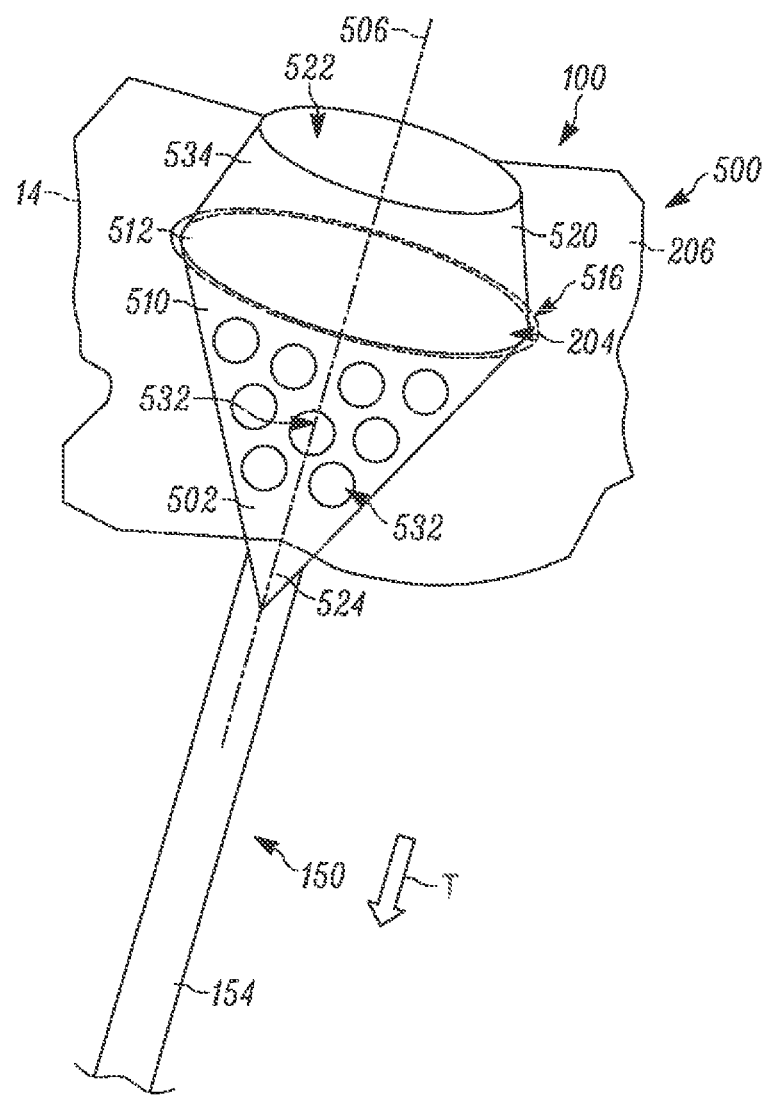
FIGS. 17A and 17B are schematic illustrations of a vent of the apparatus of FIG. 16 in different conditions.
Figure 17B:
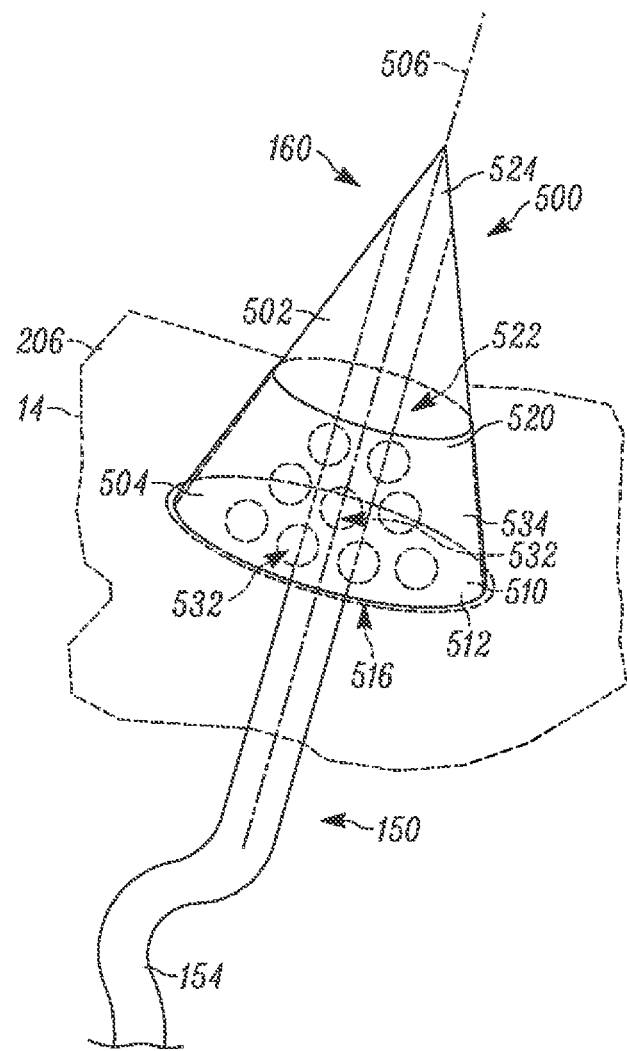

One example of the present invention implemented on the passenger side 26 of the vehicle 12 is illustrated in FIGS. 16-17B. Referring to FIG. 16, the module 30 is mounted in the instrument panel 36 of the vehicle 12 such that the air bag 14 deploys away from the instrument panel and towards the occupant 20 or 20a.

In FIGS. 17A and 17B, the vent 100 is an actuated closed vent 500 that is actuatable to prevent the release of inflation fluid from the air bag 14. In this embodiment, inflation fluid pressure in the air bag 14 acts to place/maintain the vent 500 In the closed condition at the time of deployment. The structure of the actuated closed vent 500 is illustrated schematically in FIGS. 17A and 17B.

The vent 500 has a generally conical configuration forming a conduit that extends through an opening 516 in the panel 206 of the air bag 14. The opening 516 has a shape that mates with the cross-sectional shape of the vent 500 at its interface with the wall 206. Thus, in the embodiment of FIGS. 17A and 17B, the opening 516 in the panel 206 is circular.

Referring to FIGS. 17A and 17B, the vent 500 comprises a first portion comprising a conical inner wall 502 and a second portion comprising a frustoconical outer wall 504. The inner and outer walls 502 and 504 share a common central axis 506. As shown in FIGS. 17A and 17B, respective base portions 510 and 512 of the inner and outer walls 502 and 504 meet each other at the panel 206 where they are connected to the air bag 14 about the periphery of the opening 516 in the panel. As shown in FIGS. 17A and 178, the inner and outer walls 502 and 504 can have congruent or substantially congruent configurations in which their respective base portions 510 and 512 have equal or substantially equal diameters, and the respective walls extend at equal or substantially equal angles with respect to the common axis 506.

The inner wall 502 tapers inwards from the base portion 510 and extends away from the panel 206 into the inflatable volume 54 of the air bag 14. The outer wall 504 tapers inwards from the base portion 512 and extends away from the panel 206 and away from the air bag 14 outside the inflatable volume of the air bag 14. The frustoconical outer wall 504 has an open end portion 520 that defines an outlet 522 of the vent 500. The outer wall 504 defines a passage or discharge chamber 534 through which inflation fluid can travel en route to the outlet 522.

The inner wait 502 has a closed end portion 524 to which the vent tether 154 is connected. The inner wail 502 thus acts as an actuatable vent member. The inner wall 502 includes a plurality of vent openings 532 spaced about the circumference of the inner wall. In the embodiment illustrated in FIGS. 17A and 17B, the openings 532 have a generally circular shape. The openings 532 could, however, have alternative configurations. For example, the openings could comprise elongated slots, X-shaped silts, cross-shaped slits, T-shaped slits, Y-shaped slits or other suitably shaped openings.

The actuated open vent 600 has a non-actuated open condition illustrated in FIG. 17A and an actuated closed condition illustrated in FIG. 17B. Referring to FIGS. 16 and 17A, when the occupant is a forward positioned occupant 20a the trigger tether 152 is prevented from fully tensioning and, thus, the tear stitching 130 forming the releasable connection 153 remains intact. Consequently, the vent tether 154 fully tensions to prevent actuation of the vent 500, tensioning or otherwise pulling/maintaining the inner wall 502 in an open condition positioned at least partially within the inflatable volume 54 of the air bag 14. The tensioned vent tether 154 acts against inflation fluid pressure in the air bag 14, which urges the inner wall 502 outward toward the closed condition of FIG. 17B. In the open condition, the vent tether 154 substantially or completely prevents the inner wall 502 from entering the discharge chamber 534. Fluid communication is thereby established between the inflatable volume 54 and the atmosphere surrounding the air bag 14 via the vent openings 532, the discharge chamber 534, and the outlet 522.

Referring to FIGS. 16 and 17B, when the occupant 20 is a rearward positioned occupant so as to permit the air bag 14 to fully inflate and deploy as described above in regard to FIGS. 1-3, the trigger tether 152 fully tensions to rupture the tear stitching 180 (not shown). As a result, the vent tether 164 is slackened and, thus, the vent tether 154 does not tension or otherwise pull/maintain the inner wall 202 in the open condition positioned within the inflatable volume 54 of the air bag 14. The inner wall 502 is thus free to move in response to inflation fluid pressure in the inflatable volume 54 of the air bag 14. In other words, the vent 500 is free to actuate to the closed condition.

Under the pressure of inflation fluid in the inflatable volume 54, the inner wall 502 moves to a closed condition positioned at least partially within the discharge chamber 534 defined by the outer wail 504. In the closed condition, the inner wall 502 is inverted from the open condition. Since the inner wall 502 and outer wall 504 have congruent or substantially congruent configurations, the inner wall 502, when in the closed condition mates with, overlies, and follows the contour of the cuter wall, thereby forming a tight and close fit between the walls. Inflation fluid pressure in the air bag 14 maintains this fit and the resulting seal that blocks inflation fluid flow through the openings 532.

In the closed condition of the vent 500, the vent openings 532 are positioned against corresponding portions of the outer wall 504. Since the conical inner wall 502 is closed at the end portion 524, the inflation fluid pressure in the air bag 14 presses the portions of the inner wall 502 surrounding the vent openings 532 against the corresponding portions of the outer wall 504. As a result, the outer wall 504 constrains the inner wall 502 and blocks or substantially blocks fluid communication between the inflatable volume 54 and the atmosphere surrounding the air bag 14. Inflation fluid venting is thus blocked in the actuated, closed condition of the vent 500.

The air bag construction of the present invention is advantageous in that it quickly detects the size of the occupant and automatically adjusts deployment of the air bag accordingly. Detection of the occupant position is achieved during the initial stages of deployment and, thus, the risk the occupant advances towards the air bag before detection and deployment adjustment can occur is reduced. In other words, the speed at which the air bag of the present invention detects the large or small occupant helps to ensure an inaccurate classification is not made due to, for example, an unbuckled occupant moving forward into the deploying air bag.

From the above description of the invention, those skilled in the art will perceive improvements, changes and modifications. For example, the adaptive tether configurations disclosed herein could be altered in order to adjust the shaping of the associated air bag. For example, the location on the air bag (e.g., the front panel) where the trigger tether is connected can be selected to alter or adjust the sensitivity of the trigger tether to releasing the releasable connection in response to the deploying air bag.

The above and other such improvements, changes and modifications within the skill of the art are intended to be covered by the appended claims.

Having described the invention, the following is claimed:

1. An apparatus for helping to protect an occupant of a vehicle comprising:
   an inflatable vehicle occupant protection device having a front panel presented towards the occupant and being inflatable between a vehicle surface and the occupant;
   a vent for releasing inflation fluid from the protection device, the vent having an actuated condition and a non-actuated condition, the vent being in the non-actuated condition prior to deployment of the protection device;
   a vent tether having a first end connected to the vent and a second end having a releasable connection with the protection device; and
   a trigger tether having a first end connected to the front panel and a second end connected to the protection device at the releasable connection;
   wherein the trigger tether is slackened when the protection device deploys less than a predetermined degree such that the releasable connection remains intact to allow the vent tether to place the vent in the actuated condition, deployment of the protection device to the predetermined degree tensioning the trigger tether to release the releasable connection such that the vent remains in the non-actuated condition.

2. The apparatus recited in claim 1, wherein the vent tether and the trigger tether are integrally formed with one another.

3. The apparatus recited in claim 2, wherein the releasable connection comprises tear stitching securing the vent tether and the trigger tether to the protection device.

4. The apparatus recited in claim 3, wherein the tear stitching has a teardrop shape that includes a pair of segments connected at a break point and diverging from one another and a round portion connecting the diverging segments.

5. The apparatus recited in claim 3, wherein tension on the trigger tether applies a peeling force to the tear stitching that causes the tear stitching to rupture when the protection device deploys to the predetermined degree, tension on the vent tether applying a shear force to the tear stitching that the tear stitching can withstand without rupturing when the protection device deploys less than the predetermined degree.

6. The apparatus recited in claim 5, wherein the tear stitching has a shear strength and a peel strength weaker than the shear strength.

7. The apparatus recited in claim 1, wherein the releasable connection is located on a rear panel of the protection device opposite the front panel.

8. The apparatus recited in claim 1, wherein the actuated condition of the vent is an open condition releasing inflation fluid from the protection device and the non-actuated condition is a closed condition preventing the release of inflation fluid from the protection device.

9. The apparatus recited in claim 8, wherein the vent comprises overlapping first and second portions, the first portion being secured to the protection device and including at least one vent opening for releasing inflation fluid from the protection device, the second portion being connected to the first portion with stitching to block the at least one vent opening, the vent tether being connected to the vent such that the stitching remains intact and the vent opening blocked when the protection device deploys the predetermined degree such that the vent remains in the non-actuated condition, the vent tether acting on the first portion when the protection device deploys less than the predetermined degree to rupture the stitching and unblock the at least one vent opening to place the vent in the actuated condition.

10. The apparatus recited in claim 9, wherein the first and second portions have concentric shapes.

11. The apparatus recited in claim 9, wherein the second portion is positioned between the first portion and the protection device when the vent is in the non-actuated condition.

12. The apparatus recited in claim 8, wherein the vent comprises a vent opening for releasing inflation fluid from the protection device and overlapping first and second flaps secured to the protection device and covering the vent opening, the vent tether being secured to the flaps by tear stitching to prevent relative movement between the flaps and the protection device, the stitching remaining intact and the vent opening covered when the protection device deploys the predetermined degree such that the vent remains in the non-actuated condition, the vent tether rupturing the stitching when the protection device deploys less than the predetermined degree to allow for relative movement between the flaps and the protection device in response to inflation fluid pressure to place the vent in the actuated condition.

13. The apparatus recited in claim 12, wherein the flaps are secured to an exterior surface of the protection device and the vent tether is secured to an interior surface of the protection device.

14. The apparatus recited in claim 8, wherein the vent comprises a vent opening for releasing inflation fluid from the protection device and a flap secured to the protection device and covering the vent opening, the vent tether being secured to flap and the protection device by tear stitching to prevent relative movement between the flap and the protection device, the stitching remaining intact and the vent opening covered when the protection device deploys the predetermined degree such that the vent remains in the non-actuated condition, the vent tether rupturing the stitching when the protection device deploys less than the predetermined degree to allow for relative movement between the flap and the protection device in response to inflation fluid pressure to place the vent in the actuated condition.

15. The apparatus recited in claim 14, wherein the flap is secured to an exterior surface of the protection device and the vent tether is secured to an interior surface of the protection device.

16. The apparatus recited in claim 14, wherein the vent tether is integrally formed with the flap such that the flap is disconnected entirely from the protection device when the protection device deploys less than the predetermined amount.

17. The apparatus recited in claim 1, wherein the protection device comprises a frontal air bag inflatable away from a steering wheel of the vehicle toward the vehicle occupant.

18. The apparatus reefed in claim 1, wherein the protection device comprises a frontal air bag inflatable away from an instrument panel of the vehicle toward the vehicle occupant.

19. The apparatus recited in claim 1, wherein the releasable connection remains intact in response to a forward positioned vehicle occupant, the releasable connection being released in response to a rearward positioned vehicle occupant.

20. The apparatus recited in claim 1, wherein the vent tether and the trigger tether are separate components, the second ends of the vent tether and the trigger tether comprising loops connected to a projection on the vehicle surface to form the releasable connection.

21. The apparatus recited in claim 20, wherein the second ends of the vent tether and the trigger tether remain connected to the projection when the protection device deploys less than a predetermined degree such that the vent tether tensions to place the vent in the actuated condition, deployment of the protection device to the predetermined degree releasing the second ends of the trigger tether and the vent tether from the projection such that the vent remains in the non-actuated condition.

22. The apparatus recited in claim 21, wherein the second end of the trigger tether pulls the second end of the vent tether off the projection when the protection device deploys to the predetermined degree such that the vent remains in the non-actuated condition.

23. The apparatus recited in claim 20, wherein the vehicle surface is an inflator for delivering inflation fluid to the protection device.

24. An apparatus for helping to protect an occupant of a vehicle comprising:
an inflatable vehicle occupant protection device having a front panel presented towards the occupant and being inflatable between a vehicle surface and the occupant;
a vent for releasing inflation fluid from the protection device, the vent having an actuated condition releasing inflation fluid from the protection device and a non-actuated condition preventing the release of inflation fluid from the protection device, the vent being in the non-actuated condition prior to deployment of the protection device;

a vent tether having a first end secured to the vent and a second end connected with a rear panel of the protection device opposite the front panel by rupturable tear stitching; and a trigger tether integrally formed with the vent tether and having a first end secured to the front panel and a second end connected to the protection device by the rupturable tear stitching;

wherein the trigger tether is slackened when the protection device deploys less than a predetermined degree such that the tear stitching remains intact to allow the vent tether to place the vent in the actuated condition, deployment of the protection device to the predetermined degree tensioning the trigger tether to rupture the tear stitching such that the vent remains in the non-actuated condition.

25. An apparatus for helping to protect an occupant of a vehicle comprising:

an inflatable vehicle occupant protection device having a front panel presented towards the occupant and being inflatable between a vehicle surface and the occupant;

a vent for releasing inflation fluid from the protection device, the vent having an actuated condition and a non-actuated condition, the vent being in the non-actuated condition prior to deployment of the protection device;

a vent tether having a first end connected to the vent and a second end having a releasable connection with the protection device: and a trigger tether having a first end connected to the front panel and a second end connected to the protection device at the releasable connection;

wherein the trigger tether is slackened when the protection device deploys less than a predetermined degree such that the releasable connection remains intact to allow the vent to remain in the non-actuated condition, deployment of the protection device to the predetermined degree tensioning the trigger tether to release the releasable connection such that the vent tether moves to the actuated condition.

\* \* \* \* \*